US009977966B2

United States Patent
Zakaluk

(10) Patent No.: US 9,977,966 B2
(45) Date of Patent: May 22, 2018

(54) SYSTEM AND METHOD FOR IDENTIFYING, ANALYZING, AND REPORTING ON PLAYERS IN A GAME FROM VIDEO

(71) Applicant: Robert Zakaluk, Winnipeg (CA)

(72) Inventor: Robert Zakaluk, Winnipeg (CA)

( * ) Notice: Subject to any disclaimer, the term of this patent is extended or adjusted under 35 U.S.C. 154(b) by 60 days.

(21) Appl. No.: 15/361,255

(22) Filed: Nov. 25, 2016

(65) Prior Publication Data

US 2017/0154222 A1 Jun. 1, 2017

(51) Int. Cl.
G06K 9/00 (2006.01)
G06T 7/73 (2017.01)
G06T 7/262 (2017.01)

(52) U.S. Cl.
CPC .......... *G06K 9/00724* (2013.01); *G06T 7/262* (2017.01); *G06T 7/73* (2017.01); *G06T 2207/10016* (2013.01); *G06T 2207/30196* (2013.01); *G06T 2207/30228* (2013.01)

(58) Field of Classification Search
CPC .... A63B 2024/0025; A63B 2024/0056; A63B 2220/13; A63B 2102/22; A63B 2102/24; A63B 2243/0025; A63B 2243/0037; G06K 9/00724; G06K 9/3216; G06T 2207/10016; G06T 7/33; G06T 2207/20016; G06T 2207/20076; G06T 2207/30224; G06T 2207/30228
See application file for complete search history.

(56) References Cited

U.S. PATENT DOCUMENTS 8,441,476 B2 * 5/2013 Gloudemans .......... G06K 9/346
345/419
8,805,004 B2 * 8/2014 Huang ............... G06K 9/00718
348/169

(Continued)

*Primary Examiner* — Bhavesh Mehta
*Assistant Examiner* — Ian Lemieux
(74) *Attorney, Agent, or Firm* — Kyle R Satterthwaite; Ryan W Dupuis; Ade & Company Inc.

(57) ABSTRACT

The invention is a system and method used for detection, analysis, and reporting on player metrics of a sporting event using video images. The main components of the invention are: grabbing a digital video image frame or grabbing an analog video image frame and converting the analog video image frame to a digital video image frame, extracting field of play markings from the video image frame(s) for use as image control points, creating a perspective projection registration model based upon the pairing of image control points with a set of user-defined control points representative of the field of play, extracting player image locations on each team from the video image frames, and applying the perspective projection transformation model to register participant image locations to their respective planimetric coordinate position on the user defined field of play. In the case of processing multiple video image frames, to correct errors across perspective projection transformation models developed on each image frame, a final bundle adjustment affine transformation model is applied to correct participant locations. Analysis of players use network analysis, pattern analysis, spatial interpolation, hypothesis testing, or forecast modeling can then be performed with reports in tabular, chart and graphic, or cartographic formats.

19 Claims, 18 Drawing Sheets

(56) References Cited

U.S. PATENT DOCUMENTS

| | | | |
|---|---|---|---|
| 9,031,279 B2* | 5/2015 | Gefen | G06T 7/2093 |
| | | | 382/103 |
| 9,094,615 B2* | 7/2015 | Aman | G01S 3/7864 |
| 9,437,012 B2* | 9/2016 | Gefen | G06T 7/2093 |
| 2008/0129825 A1* | 6/2008 | DeAngelis | A63B 24/0021 |
| | | | 348/169 |
| 2010/0030350 A1* | 2/2010 | House | A63B 24/0021 |
| | | | 700/91 |
| 2012/0201469 A1* | 8/2012 | Livet | G06K 9/6202 |
| | | | 382/201 |
| 2013/0335635 A1* | 12/2013 | Ghanem | G01S 3/7865 |
| | | | 348/659 |
| 2014/0376874 A1* | 12/2014 | Aman | A63B 24/0021 |
| | | | 386/223 |
| 2015/0221096 A1* | 8/2015 | Gefen | G06T 7/2093 |
| | | | 382/103 |

* cited by examiner

300

Table 1. Morphological operations, in order of use, applied to field of play markings, using ice hockey as an example.

| Morphological Operation | Yellow Line | Blue Line | Center Line | Hash Line | Face Off Spot | Goal Line | Defense Line |
|---|---|---|---|---|---|---|---|
| 1) opening | | ✓ | ✓ | | ✓ | | |
| 2) thinning | ✓ | ✓ | ✓ | ✓ | | ✓ | ✓ |
| 3) spur removal | ✓ | ✓ | ✓ | ✓ | | ✓ | ✓ |
| 4) cleaning | ✓ | ✓ | ✓ | ✓ | | ✓ | ✓ |
| 5) region filling | | | | | ✓ | | |
| 6) erosion | | | | | ✓ | | |

1300

1310

|  | Player | X | Y | f(X) = X | f(Y) = 1.01Y |
|---|---|---|---|---|---|
| Team X | 1 | 74.0 | 53.4 | 74.0 | 53.9 |
|  | 2 | 77.1 | 28.4 | 77.1 | 28.7 |
|  | 3 | 104.7 | 50.0 | 104.7 | 50.5 |
|  | 4 | 105.1 | 41.7 | 105.1 | 42.1 |
|  | 5 | 107.3 | 32.4 | 107.3 | 32.7 |
| Total | 5 |  |  | 468.2 | 208.0 |
| CG |  |  |  | 93.6 | 41.6 |
| Team O | 1 | 121.0 | 58.6 | 121.0 | 59.2 |
|  | 2 | 130.8 | 23.7 | 130.8 | 23.9 |
|  | 3 | 113.4 | 50.3 | 113.4 | 50.8 |
|  | 4 | 108.2 | 45.1 | 108.2 | 45.5 |
|  | 5 | 104.1 | 30.2 | 104.1 | 30.5 |
| Total | 5 |  |  | 577.6 | 210.0 |
| CG |  |  |  | 115.5 | 42.0 |

1320

|  | Player | X | Y | f(X) = X | f(Y) = 1.01Y |
|---|---|---|---|---|---|
| Team X | 1 | 74.0 | 53.4 | 74.0 | 53.9 |
|  | 2 | 77.1 | 28.4 | 77.1 | 28.7 |
|  | 3 | 104.7 | 50.0 | 104.7 | 50.5 |
|  | 4 | 105.1 | 41.7 | 105.1 | 42.1 |
|  | 5 | 107.3 | 32.4 | 107.3 | 32.7 |
| Team O | 1 | 121.0 | 58.6 | 121.0 | 59.2 |
|  | 2 | 130.8 | 23.7 | 130.8 | 23.9 |
|  | 3 | 113.4 | 50.3 | 113.4 | 50.8 |
|  | 4 | 108.2 | 45.1 | 108.2 | 45.5 |
|  | 5 | 104.2 | 30.2 | 104.2 | 30.5 |
| Total | 10 |  |  | 1,045.8 | 417.9 |
| CG |  |  |  | 104.6 | 41.8 |

FIG. 13

X - Team X Player Location   O - Team O Player Location   ☐ - Player Zone

X - Team X Player Location   O - Team O Player Location

1700

1800

Table 3. Velocity of teams.

| Velocity | Team | |
|---|---|---|
| | X | O |
| m/sec | 4.46 | 4.03 |
| km/hr | 16.07 | 14.5 |

1900

Table 4. Distances between players on the ice (ft), excluding the goalie.

| Player | | Team X | | | | | Team O | | | | |
|---|---|---|---|---|---|---|---|---|---|---|---|
| | | 1 | 2 | 3 | 4 | 5 | 1 | 2 | 3 | 4 | 5 |
| Team X | 1 | 0 | 29.69 | 38.30 | 17.21 | 9.75 | 7.17 | 20.99 | 6.56 | 35.79 | 16.58 |
| | 2 | 29.69 | 0 | 30.59 | 38.70 | 32.66 | 34.71 | 39.24 | 36.11 | 62.07 | 43.76 |
| | 3 | 38.30 | 30.59 | 0 | 32.22 | 32.50 | 37.48 | 29.01 | 43.61 | 52.93 | 54.62 |
| | 4 | 17.21 | 38.70 | 32.22 | 0 | 7.75 | 10.86 | 4.65 | 17.84 | 23.70 | 27.89 |
| | 5 | 9.75 | 32.66 | 32.50 | 7.75 | 0 | 5.13 | 11.24 | 12.12 | 29.52 | 23.11 |
| Team O | 1 | 7.17 | 34.71 | 37.48 | 10.86 | 5.13 | 0 | 15.18 | 7.21 | 28.85 | 18.04 |
| | 2 | 20.99 | 39.24 | 29.01 | 4.65 | 11.24 | 15.18 | 0 | 22.30 | 24.83 | 32.52 |
| | 3 | 6.56 | 36.11 | 43.61 | 17.84 | 12.12 | 7.21 | 22.30 | 0 | 31.99 | 11.10 |
| | 4 | 35.79 | 62.07 | 52.93 | 23.70 | 29.52 | 28.85 | 24.83 | 31.99 | 0 | 35.84 |
| | 5 | 16.58 | 43.76 | 54.62 | 27.89 | 23.11 | 18.04 | 32.52 | 11.10 | 35.84 | 0 |

Table 5. Area of player zones, excluding goalies, on the ice (ft²).

| Zone | Area (ft²) |
|---|---|
| 1 | 453 |
| 2 | 3897 |
| 3 | 3816 |
| 4 | 155 |
| 5 | 201 |
| 6 | 119 |
| 7 | 737 |
| 8 | 161 |
| 9 | 4340 |
| 10 | 2882 |

FIG. 20

SYSTEM AND METHOD FOR IDENTIFYING, ANALYZING, AND REPORTING ON PLAYERS IN A GAME FROM VIDEO

CROSS REFERENCE TO OTHER APPLICATIONS

This application claims benefit under 35 U.S.C. 119(a) of Canadian Patent Application No. 2,913,432, filed Nov. 26, 2015.

FIELD OF THE INVENTION

The invention is related to image data processing (G06T) of the Cooperative Patent Classification (CPC) system or image analysis classification (382) of the United States Patent Classification (USPC) system. Specifically, the invention is a computer-implemented method of and system for processing video of sporting events using image frames at different scales and at different oblique viewing angles, to identify and locate players, project players, analyze players, and report results of the player analysis, thus improving on the image processing technology of the prior art.

GENERAL BACKGROUND INFORMATION

Sports fans, sports players, and sports management are looking beyond watching a game and reviewing the post-game data generated by human observation. The locations of several participant(s) or player(s) in a "fast-moving" game such as ice hockey dynamically changes; making the constant recording of player locations by human observation unfeasible. Video, comprised of a series of image frames, produced from a game can be digitized and processed as electronic images to generate additional data beyond the capability of human observation. The predefined area of play such as an ice hockey rink, can be thought of as an XY Cartesian plane with user-defined coordinates suitable for recording player locations. Video, often collected for watching by a wide audience, does more than simply offer a view of the game. Video is a "data-ready" technology that depicts players and player locations at different scales, from vertical to oblique angles, suitable for extracting the identification of players and registering player locations digitally to a predefined XY Cartesian plane covering the field of play.

The use of spatial analysis to identify spatial patterns and make predictions has moved beyond the use of analog data such as: photographs or human observation. Spatial analysis now utilizes digitally acquired data that can be directly input into a computer system for processing. To improve the spatial analysis of sports participants to identify patterns and make predictions requires volumes of data beyond the capability of analog recording by human observations. Digital player identification data and digital player location data, extracted from video image frames, can be implemented in a system to process metrics for post-game analysis and reporting. There is therefore, a need for an improved method of and system for such computer-based processing large volumes of video data to detect, analyze, and report on players in sporting events that goes beyond human observation.

DESCRIPTION OF PRIOR ART

Prior art has addressed the problem of processing video image frames for multiple object detection and multiple object tracking using players participating in a sporting event as an example (US 20100030350 A1, US 20110013836 A1, US 201300335635 A1, and US 20140376874 A1). In general, approaches in the prior art indicate some combination of the following to detect players with an image or images: 1) the use of one or more cameras producing overlapping images or stereopairs; 2) the use of imagery acquired in the ultraviolet (UV) or infrared (IR) region; 3) passive markers or active markers attached to the targets of interest that either radiate at a specified region of the electromagnetic spectrum detectable by the camera or cameras or irradiate at a specified region of the electromagnetic spectrum detectable by the camera or cameras, respectively; 4) image segmentation; or 5) image registration to a common coordinate system using feature based or non-feature based methods.

Prior art using overlapping images or stereopairs acquired by one or more cameras is an approach to eliminate player omission errors and player commission errors. The invention of US 20140376874 A1 indicates that using multiple cameras for object detection entails that a marked object must be acquired by at least two cameras at the same instant. As more cameras are added to the invention, more images are acquired for processing, adding more processing overhead time to the overall system. Hence, prior art using overlapping images or stereopairs acquired by one or more cameras is limiting.

Prior art that uses the UV or IR spectral regions, with or without markers, are another approach to eliminating player omission errors and player commission errors in the process of detecting players in an image. Prior art using the UV or IR spectral regions are typically coupled with the use of UV or IR passive or active markers attached to the target objects or players. A shortcoming with using the UV or IR regions is that dedicated cameras acquiring images in the UV or IR spectral regions would be needed. Also, passive markers affixed to players would require a source of irradiance capable of generating energy in the same region of the electromagnetic spectrum as the markers, otherwise the markers would not be detectable by the camera(s). Markers of any type would also have to be of sufficient size and shape to be detectable by the spatial resolution of the camera(s). The size and shape of markers could also make the markers conspicuous to an audience viewing the sporting event. Therefore, the application of the UV or IR spectral regions, with or without markers, in the prior art of detecting players in an image is limiting.

Various methods are used in the prior art to identify multiple objects or players in a given image. A shortcoming with an invention using only image segmentation to identify multiple objects in the foreground of an image is determining a thresholding value. Changes in scene to scene spatial content in the image introduce changes to the frequency of brightness values in the image and thus changes in image thresholding values. Consequently, as a stand-alone solution for player detection, the use of thresholding within the image segmentation process would result in unpredictable player commission errors and player omission errors.

To improve the image segmentation method, the invention of CA 2749723, which does not use players in a sporting event as an example, includes a nearest neighborhood technique comparing distances between object candidates using a ten pixel distance threshold to distinguish unique objects. However, the issue with adding a pixel distance threshold to the solution, is that variation in image scale causes the size and distance between objects to vary. Variation in image scale is the result of distance object relationships, image acquisition viewing angles, and the focal length of the video camera. Objects will appear larger in large scale images with reduced distances between objects. In addition, scale variation, will also be a factor in the resultant shape of objects in images, making the use of multivariate measures of object shape as means of detecting target objects in an image difficult to maintain. Thus, variation in image scale causes variation in the distance between objects and variation in the shape of objects resulting in a source of object detection omission errors and object detection commission errors for prior art that only relies on the image segmentation method with a nearest neighborhood distance technique as a means of object detection.

To track players using video image frames requires a comparison of player locations across multiple images. However, player locations detected across multiple images are not relative to one another since each image frame has unique, independent image coordinate space that doesn't overlap, making multitemporal image to image player location comparisons impossible. The absence of a common reference coordinate space across images is further compounded by a combination of images acquired from different locations, images acquired at multiple scales, and images acquired at multiple viewing angles. In addition, topology or a spatial awareness of player locations relative to each other, player locations relative to their locations on the field of play, and locations of other field of play features to one another is missing. Techniques in the prior art for topology, object differences at multiple scales, and nominal scaling of spatial objects are described in the prior art of: DeMers, Michael. *Fundamentals of Geographical Information Systems*, 4$^{th}$ edition. New York, N.Y.: John Wiley & Sons, 2009. A common reference coordinate system using image registration is required to normalize player locations across image frames for player tracking. Further object comparisons can be made with the inclusion of topology.

Image to image registration is a technique used in the prior art to produce a common reference coordinate system across images for multitemporal player tracking. An issue with prior art using an image to image registration technique for registering overlapping images is the possibility of either retaining a perspective view angle that lacks a common planimetric coordinate system relative to the field of play or the possibility of using a reference image that is not at all tied to the field of play. In particular, the use of non-feature based image to image registration techniques in the prior art for producing common coordinate space among overlapping images will lack spatial feature knowledge or topology, essential for automated recognition of where the registered images are located relative to each other and where the registered images are located relative to the field of play. Thus, prior art using an image to image registration technique, such as US 2013/0335635 A1, still require additional registration processing of coregistered overlapping images to a planimetric coordinate system via a reference image relative to the field of play before topology can be recognized.

The prior art of US 2010/0039350 A1 or US 2011/0013836 A1 use a model of the camera(s) orientation to produce a common reference coordinate system across images before multitemporal player tracking. The use of a model of the cameras orientation will require prior knowledge of the camera(s) orientation relative to the field of play with results of the image registration still lacking feature topology. The use of camera models in a process will still require additional registration processing of coregistered overlapping images to a planimetric coordinate system via a reference image relative to the field of play before topology can be recognized.

To facilitate player tracking and enhance spatial analysis, a desirable computer-implemented solution for detecting changes in player locations would register player locations directly to a common, reference planimetric coordinate system tied to the field of play and create topology using reference control points without the need to first register overlapping images to each other or the need to use a reference image.

SUMMARY OF THE INVENTION

According to a first aspect of the invention, there is provided a method for automated processing of a single image frame or multiple image frames acquired from a video source, said processing being performed by one or computers and comprising the following steps of:

a) selecting an image frame from said single image frame or from said multiple image frames, b) creating multispectral ratios, multispectral indices, and multispectral transformations from the wavebands of said selected image frame from step (a), c) producing a field of play mask using polychotomous classification of said multispectral ratios, multispectral indices, and multispectral transformations from step (b), d) identifying field of play marking object candidates from said selected image frame from step (a) using polychotomous classification of said multispectral ratios, multispectral indices, and multispectral transformations from step (b) under said field of play mask from step (c), e) creating univariate object shape measures of said field of play marking object candidates from step (d), f) creating field of play markings with topology from said field of play marking object candidates from step (d) using: 1) a conditional expression of said multispectral ratios, multispectral indices, and multispectral transformations from step (b) and said univariate object shape measures from step (e); 2) using either ANN modelling inputs of said multispectral ratios, multispectral indices, and multispectral transformations from step (b) and said univariate object shape measures from step (e); or 3) the Radon transform, g) creating XY image control points from morphological operations of said field of play markings with topology from step (f), h) creating field of play control lines with topology using polynomial regression modelling from said field of play markings with topology from step (f), i) creating XY image control points with topology from intersections of said field of play control lines with topology from step (h), j) building a point to point file by combining said image control points from steps (g) and (i) and pairing said image control points from steps (g) and (i) with the predefined field of play reference control points, k) creating a perspective projection image to field of play georeferencing transformation model from said point to point file from step (j), l) identifying player object candidates from said selected image frame using polychotomous classification of said multispectral ratios, multispectral indices, and multispectral transformations from step (b) under said field of play mask from step (c), m) creating univariate object shape measures of the said player object candidates from step (l), n) outputting and labelling player object fragments by team from said player object candidates from step (l) using ANN models of inputs containing said multispectral ratios, multispectral indices, and multispectral transformations from step (b) and said univariate object shape measures from step (m), o) creating XY Cartesian player fragment locations by team, registered to the field of play, by applying the said transformation model from step (k) to said player object fragments by team from step (n), p) aggregating said XY Cartesian player fragment locations by team from step (o) to identify single XY Cartesian player locations for each player on each team, and q) saving player locations, team identifier, the perspective to planimetric projection transformation model, control points, rink topology, and image frame identifier on a non-transitory computer readable medium.

The computer implementation of the method is an essential element of the present invention and not a mere convenience, as the forgoing steps, and others recited herein below, involve an intensive volume of complex calculations per each image frame that could not be carried out in a non-automated basis in a time effective manner capable of providing useful results. To the contrary, human performed data extraction achieved from viewing image frames of sporting events relies on human cognitive abilities, which are not functionally equivalent or comparable to the novel and inventive combination of steps disclosed herein. Accordingly, the method is not merely an automation of a mental process, but rather is a unique solution derived specifically for the desire to develop of an at least semi-automated computer implemented solution. In addition, the computer-executed method actually improves the efficiency and/or function of the overall image capture and processing systems of the prior art, thus providing a technological improvement to the field of image processing technology. The system is more efficient by avoiding the need for increased camera quantities as required for stereopair image acquisition in the prior art, need for specialized UV/IR image acquisition in the prior art, or need for establishing camera orientation models relative to the field of play in the prior art. At the same time, performance is also improved by using the unique combination of techniques to overcome the error-prone shortcomings in the prior art concerning thresholding issues in image segmentation, image scale variation, topology and spatial awareness.

When multiple image frames are acquired from the video source, said multiple image frames may vary from one another in scale and oblique view angle.

When multiple image frames are processed, the method may further include producing an automatic final bundle adjustment model to correct participant location errors across said multiple image frames by performing the following additional steps of:

r) transforming said image control points from steps (g) and (i) of each of said multiple image frames using a perspective projection image frame georeferencing transformation model from step (k) and relating to all predefined field of play reference control points, s) building a final bundle adjustment affine transformation model using results from step (r), t) applying said final bundle adjustment affine transformation model from step (s) on said single XY Cartesian player locations for each player on each team from step (p) from said multiple image frames, u) storing said final bundle adjustment affine transformation model from step (s) and final adjusted player location results from step (t) in non-transitory computer readable memory.

The method may include a further computer-implemented step of determining a center of gravity (CG) for the players on each team by calculating the weighted average of player planimetric locations on a given team indexed to a single image frame identifier. Center of gravity techniques are described in the prior art of: McGrew Jr, J. C., and C. B. Monroe. *An introduction to statistical problem solving in geography, $2^{nd}$ edition*. Waveland Press, 2009.

The method may include a further computer-implemented step of performing a network analysis based upon the CG calculations. The network analysis may include calculation of flow speed, flow direction, distance between team paths, and/or dispersal of team paths. Network analysis techniques are described in the prior art of: Ahuja, R. K., Magnanti, T. L., and J. B. Orlin. Network flows (No. MIT-WP-2059-88). Alfred P Sloan School of Management, Cambridge, Mass. 1988.

The method may include a further computer-implemented step of performing of a pattern analysis based upon the CG calculations. The pattern analysis may comprise calculation of: player nearest neighbor distances, player zone coverage, team density, team adjacency, team connectivity, and/or player isolation. Pattern analysis techniques are described in the prior art of: Duda, R. O., P. E. Hart, and D. G. Stork. *Pattern Classification, $2^{nd}$ edition*. New York, N.Y.: John Wiley & Sons, 2001.

The method may include a further computer-implemented step of performing spatial interpolation analysis based upon the CG calculations. The spatial interpolation analysis may be comprised of trend surface modelling, spline interpolations, inverse distance weighting, and/or kriging. Spatial interpolation techniques are described in the prior art of: Lam, Nina Siu-Ngan. "Spatial interpolation methods: a review." The American Cartographer 10.2 (1983): 129-150.

The method may include a further computer-implemented step of performing of a hypothesis testing analysis based upon CG calculations, which is comprised of statistical analysis of a null and alternative hypothesis of measurements derived from player locations. Statistical analysis of a null hypothesis and alternative hypothesis techniques are described in the prior art of: McGrew Jr, J. C., and C. B. Monroe. *An introduction to statistical problem solving in geography, $2^{nd}$ edition*. Waveland Press, 2009.

The method may include a further computer-implemented step of performing a forecast analysis based upon CG calculations, which is comprised of ANN models, polynomial regression, multivariate regression, and exponential smoothing to predict future outcomes. Prior art describing ANN modelling can be found in: Fausett, Laurene. *Fundamentals of Neural Networks: Architectures, Algorithms And Applications, $1^{st}$ Edition*. Englewood Cliffs, N.J.: Prentice-Hall, 1994; and Haykin, Simon. *Neural Networks A Comprehensive Foundation, $2^{nd}$ edition*. Upper Saddle River, N.J.: Prentice-Hall, 1999. Prior art describing forecast analysis can be found in: Burt, J. E., and G. M. Barber. *Elementary Statistics for Geographers, $2^{nd}$ edition*. New York, N.Y.: The Guilford Press, 1996; and Tabachnick, B. G., and L. S. Fidell. *Using multivariate statistics. $5^{th}$ edition*. Pearson Education, 2007.

The method may include computer generation of tables, graphs, cartography, and alerts, and analog or digital presentation of at least one of said tables, graphs, cartography, and alerts. As used herein, analog presentation includes printed or other permanent or semi-permanent display on a physical substrate, for example a printed paper copy, as distinguished from digital presentation, which encompasses on-screen or other temporary display using electronic means (e.g. TV screen, computer monitor, projector, etc.). Cartographic techniques are described in the prior art of: Dent, B. D. *Cartography-thematic map design, 5th edition*. McGraw-Hill, 1999.

Said tables may be comprised of: numeric, text, or alphanumeric data.

Said graphs may be comprised of: pie, bar/column, line, flowchart, and point graphs.

Said cartography may be comprised of: dasymetric mapping, choropleth mapping, isarithmic mapping, dot mapping, proportional symbol mapping, cartograms, and flow mapping cartography.

Said alerts may be comprised of: text, sound, image, and electronic signals.

The method may include wide-cast electronic delivery of output data from one or more analyses performed in said method.

Each computer-implemented step recited above is fully computer-automated, relying on execution of the step by one or more computer processors, without requiring human interaction.

According to a second aspect of the invention, there is provided non-transitory computer readable memory having stored thereon statements and instructions for execution by a computer processor to perform the forgoing method.

According to a third aspect of the invention, there is provided a system for automated processing of a single image frame or multiple image frames acquired from a video source, the system comprising one or more computers having at least one processor and non-transitory computer readable memory connected to said at least one processor, said computer readable memory having stored thereon statements and instructions for execution by said at least one processor to perform the forgoing method.

According to a fourth aspect of the invention, there is provided a method of producing an automatic final bundle adjustment affine transformation model to correct participant location errors across multiple image frames that have been analyzed to detect and locate players from opposing teams among a plurality of sport participants in said multiple image frames, the method comprising:

a) transforming image control points from each of said multiple image frames using a perspective projection image frame georeferencing transformation model and relating said transformed image control points to all predefined field of play reference control points, b) building a final bundle adjustment affine transformation model using results from step (a), c) applying said final bundle adjustment affine transformation model from step (b) on single XY Cartesian player locations for each player on each team, and d) storing said final bundle adjustment affine transformation model from step (b) and final adjusted player location results from step (c) in non-transitory computer readable memory.

According to a fifth aspect of the invention, there is provided non-transitory computer readable memory having stored thereon statements and instructions for execution by a computer processor to perform the method of the fourth aspect of the invention.

According to a sixth aspect of the invention, there is provided a system for automated processing producing an automatic final bundle adjustment affine transformation model to correct participant location errors across multiple image frames that have been analyzed to detect and locate players from opposing teams among a plurality of sport participants in said multiple image frames, the system comprising one or more computers having at least one processor and non-transitory computer readable memory connected to said at least one processor, said computer readable memory having stored thereon statements and instructions for execution by said at least one processor to perform the method of the fourth aspect of the invention.

LIST OF FIGURES

One embodiment of the invention will now be described in conjunction with the accompanying drawings in which:

FIG. 13 depicts tables of player locations set up to allow calculation of the center of gravity (CG) within a team and across both teams.

FIG. 19 depicts a tabular report produced in the reporting subsystem, using ice hockey as an example, determined using the player analysis subsystem, showing the distances between players on the ice, excluding goalies.

FIG. 20 depicts a tabular report produced in the reporting subsystem, using ice hockey as an example, determined using the player analysis subsystem, showing the area of the player zones on the ice rink.

DETAILED DESCRIPTION

Figure 1:
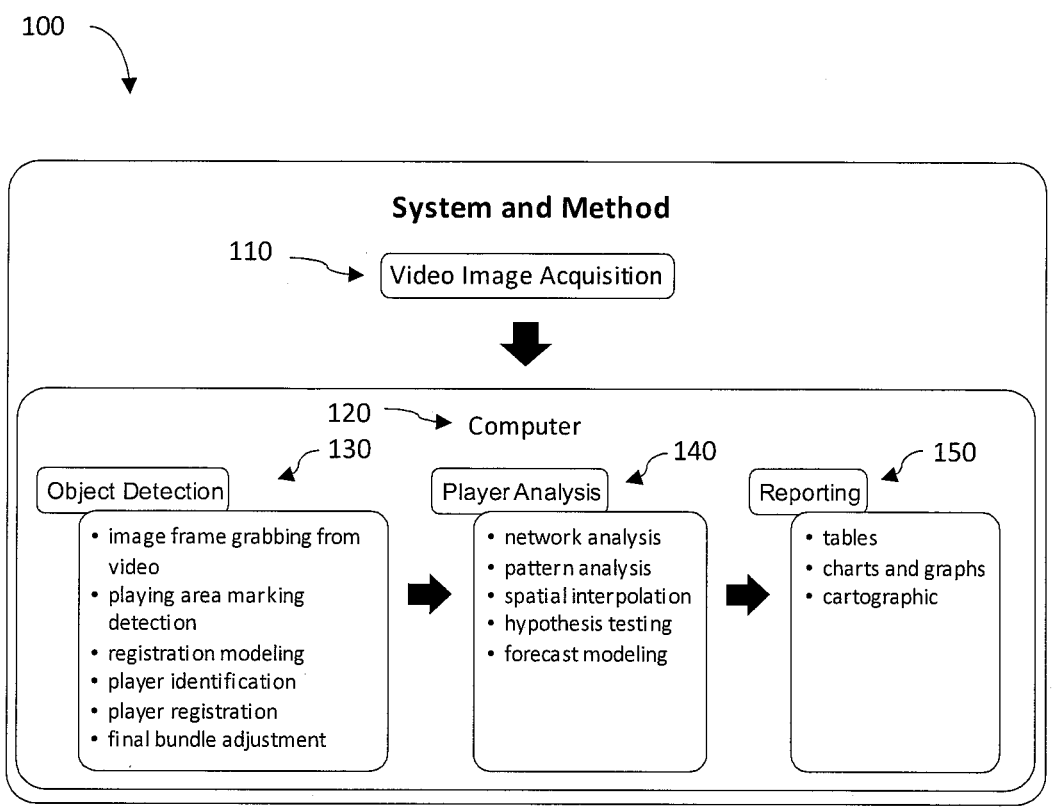
FIG. 1 depicts relationships among the methods in a system for identifying and analyzing participants from video image frames.

To improve the prior art for an image processing system and method using video image frames acquired in the visible region for multiple object detection of players and tracking of players, the disclosed embodiment of the present invention utilizes a subsystem approach containing: 1) multispectral wavebands contained in the image frame, multispectral ratios derived from the image frame, multispectral indices derived from the image frame, and multispectral transformations derived from the image frame to increase multispectral variability, compress data, avoid the use of dedicated cameras in the UV and IR spectral regions, and avoid the use of active markers or passive markers attached to the players; 2) supervised ANN models to overcome omission errors and commission errors in the automated detection of field of play markers and automated detection of players from multiscale images; 3) an automated image control point to field of play reference control point geocorrection process that facilitates topological modelling of players and field of play markings, eliminating the need for image to image registration of overlapping images to each other and/or registration of coregistered overlapping images to a reference image; 4) a final bundle adjustment method to correct perspective projection transformation model errors across processed image frames; 5) projection of player fragments to a XY Cartesian plane tied to the field of play before final aggregation into single player locations and thus avoiding image scale variation and image view angle variation that can occur during image acquisition; 6) center of gravity locational data by team for use in the player analysis subsystem; 7) a player analysis subsystem dedicated to the analysis of player or team locations; and 8) a reporting subsystem dedicated to the production and distribution of results produced within the player analysis subsystem.

The disclosed embodiment of invention is a system and a method for identifying, projecting and analyzing player locations extracted from a sequence of image frame(s) for the purpose of generating metrics in support of post-game analysis and reporting. The system is further composed of object detection, player analysis, and reporting subsystems. Within the object detection subsystem, a video image frame control point to reference control point perspective projection model is built. The video image frame can be acquired by a multispectral video camera using the visible region of the electromagnetic spectrum, multiple focal lengths, and multiple viewing angles. Marks on the field of play in the video image frame are identified and used to either directly determine video image frame control point locations or used to build control lines whose intersections determine video image frame control point locations. Video image frame control points are then paired with user defined planimetric reference control points that topologically describe the field of play. The perspective projection model is then built from the paired video image frame control points and reference control points. Techniques for building a perspective projection model from image control points and reference control points can be found in: Mikhail, E. M., J. S. Bethel, J. S., and J. C. McGlone. *Introduction to Modern Photogrammetry*. New York, N.Y.: John Wiley & Sons, 2001; and Hartley R. I., and A. Zisserman. *Multiple View Geometry in Computer Vision, $2^{nd}$ edition*. Cambridge, UK: Cambridge University Press, 2004. The locations of player fragments on each team in the image frame are then extracted from the image. Using the perspective projection model, player fragment locations on each team, in image coordinate space, are then projected to the user defined field of play. Player fragments are then aggregated to build individual player locations. If a series of image frames are used, a final bundle adjustment using an affine transformation is made by modelling the paired projected video image frame control points and reference control points of all image frames in the series. The final bundle adjustment model is then applied to all individual player locations found in the series of image frames. The player locations from an image frame or series of image frames are now registered to the user defined Cartesian plane tied to the field of play. Within the player analysis subsystem, player locations can be analyzed using spatial modelling techniques. The reporting subsystem produces final output in the form of analog reports or digital reports which include, but are not limited to tabular data, graphs or charts, cartographic maps, or an alert signal.

FIG. 1 outlines the elements of the system 100 depicting an example of intended use on a single computer acquiring video of an ice hockey game. The system 100 includes the video image acquisition 110 component using a video camera(s) collecting multispectral video in the visible region at multiple focal lengths and multiple viewing angles. The system 100 also includes a computer(s) 120 consisting of an object detection subsystem 130, player analysis subsystem 140, and reporting subsystem 150. The system 100 could be developed for any number of different types of 'computer', which herein is intended to encompass various computerized devices including smart phones, gaming devices, smart televisions, cloud computing environments, parallel computing environments, graphic processing unit (GPU) environments, tablet computers, laptop computers, desktop computers, or computer servers. The computer 120, in the context of this system 100 is not limited to application on a single computer. The system 100 could also be developed for the aforementioned computer 120 utilizing wireless, wired, or stand-alone networking environments.

Each subsystem may comprise a respective software program, or a respective software module of a larger overall program that also embodies one or more of the other subsystems. Each software program or module contains statement and instructions stored on a non-transitory computer readable medium and executable by a processor of the computer to perform the tasks, routines, algorithms described below in relation to the subsystem concerned. The software programs or modules may be stored together on a single computer readable medium, or on multiple computer readable media in communication with the processors of one or more computers, whether through direction connection at the physical location of those one more computers, or whether through remote connection thereto through a local or wide area network.

Figure 2:
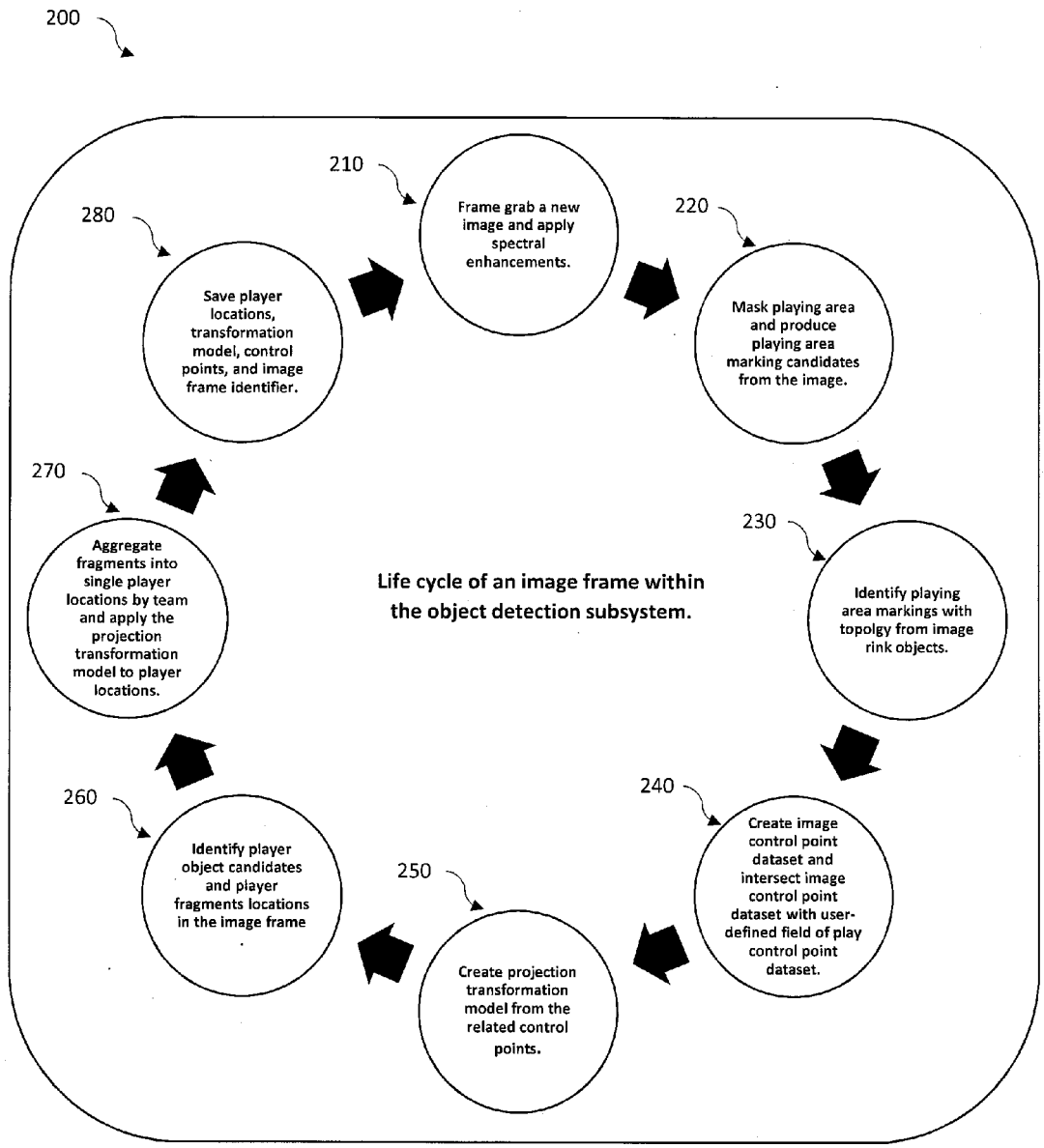
FIG. 2 depicts the life cycle of a given image frame extracted from a video segment within the object detection subsystem.

The object detection subsystem 130 consists of frame grabbing a video image, field of play marking detection, point to point registration modelling, player identification by team, player registration to the field of play, and a final bundle adjustment to player locations. A given video image frame is grabbed by the computer 120 from the video image acquisition 110. The video image frame grabbing can either be a digital video image frame or an analog video image frame converted to a digital video image frame. The image frame can be grabbed from a real time, streaming video camera feed or acquired from previously recorded video. FIG. 2 outlines the life cycle of a video image frame 200 within the object detection subsystem 130.

To increase multispectral variability, one or more spectral enhancements in the form of multispectral ratios, multispectral indices and multispectral transformations are then applied to the digital image. The following equations are used in step 210 with red (R) intensities, green (G) intensities, and blue (B) intensities normalized to a range from zero to one:

$$m = \min\{R, G, B\} \quad \text{Eq. (1)}$$

$$B' = \left(B - \frac{R+G+B}{3}\right) \quad \text{Eq. (2)}$$

$$f(b') = \begin{cases} \dfrac{B' - \overline{B'}}{\sqrt{\dfrac{1}{n-1}\sum_{i=1}^{n}(B'i - \overline{B'})^2}}, & \text{if } b' \leq 4 \\ 4, & \text{otherwise} \end{cases} \quad \text{Eq. (3)}$$

$$K = 1 - \max\{R, G, B\} \quad \text{Eq. (4)}$$

$$Yl = \frac{1 - B - K}{1 - K} \quad \text{Eq. (5)}$$

$$f(y) = \begin{cases} \dfrac{Yl - \overline{Yl}}{\sqrt{\dfrac{1}{n-1}\sum_{i=1}^{n}(Yli - \overline{Yl})^2}}, & \text{if } y \leq 4 \\ 4, & \text{otherwise} \end{cases} \quad \text{Eq. (6)}$$

$$f(r) = \begin{cases} \dfrac{\left(\dfrac{R-G}{R+G}\right)+1}{2}, & \text{if } r \leq 1 \\ 0, & \text{otherwise} \end{cases} \quad \text{Eq. (7)}$$

$$f(r') = \begin{cases} \dfrac{\left(\dfrac{R-G}{R+G}\right)+1}{2(\max\{R,G,B\})}, & \text{if } r' \leq 1 \\ 0, & \text{otherwise} \end{cases} \quad \text{Eq. (8)}$$

$$C = \frac{1 - R - K}{1 - K} \quad \text{Eq. (9)}$$

$$M = \frac{1 - G - K}{1 - K} \quad \text{Eq. (10)}$$

$$\begin{bmatrix} X \\ Yg \\ Z \end{bmatrix} = \begin{bmatrix} R \\ G \\ B \end{bmatrix} \begin{bmatrix} 0.412453 & 0.357580 & 0.180423 \\ 0.212671 & 0.715160 & 0.072169 \\ 0.019334 & 0.119193 & 0.950227 \end{bmatrix} \quad \text{Eq. (11)}$$

$$L = 166 \times h\left(\frac{Yg}{Yw}\right) - 16 \quad \text{Eq. (12)}$$

$$a = 500\left[h\left(\frac{X}{Xw}\right) - h\left(\frac{Yg}{Yw}\right)\right] \quad \text{Eq. (13)}$$

$$b = 200\left[h\left(\frac{Yg}{Yw}\right) - h\left(\frac{Z}{Zw}\right)\right] \quad \text{Eq. (14)}$$

$$h(q) = \begin{cases} \sqrt[3]{q}, & q > 0.008856 \\ 7.787Q + \dfrac{16}{116}, & q \leq 0.008856 \end{cases} \quad \text{Eq. (15)}$$

$$V = \max\{R, G, B\} \quad \text{Eq. (16)}$$

$$C = V - \min\{R, G, B\} \quad \text{Eq. (17)}$$

$$H' = \begin{cases} \text{undefined}, & \text{if } C = 0 \\ \dfrac{G - B}{C} \bmod 6, & \text{if } M = R \\ \dfrac{B - R}{C} + 2, & \text{if } M = G \\ \dfrac{R - G}{C} + 4, & \text{if } M = B \end{cases} \quad \text{Eq. (18)}$$

$$H = H' \times 0.1667 \quad \text{Eq. (19)}$$

$$S = \begin{cases} 0, & \text{if } C = 0 \\ \dfrac{C}{V}, & \text{otherwise} \end{cases} \quad \text{Eq. (20)}$$

$$NDGB = \left(\frac{G - B}{G + B}\right) \quad \text{Eq. (21)}$$

$$BRshift = \left(\frac{G + B}{R + G}\right) \quad \text{Eq. (22)}$$

$$RGratio = \left(\frac{R}{G}\right) \quad \text{Eq. (23)}$$

$$BGratio = \left(\frac{B}{G}\right) \quad \text{Eq. (24)}$$

where: m is a digital image containing the minimum RGB intensities; B' is a transformation derived from subtracting blue intensities from the mean RGB intensities; f(b') is normalized B' intensities; K is the black transformation of the digital image; Yl is the yellow transformation of the digital image; y is a digital image of normalized Yl intensities; r is a normalized difference index equation using RG intensities; r' is a normalized difference index equation using RG intensities and the maximum RG intensities; C the cyan transformation of the RK intensities; M is the magenta transformation of the GK intensities; X is the red X transformation; Yg is the green Y transformation; Z is the blue Z transformation; Xw is the red X transformation normalized to a reference white point defined by X/0.950456; Yw is the green transformation defined by Yg; Zw is the blue Z transformation normalized to a reference white point defined by Z/1.088754; L is the lightness transformation; a is the red to green opponent; b is the yellow to blue opponent; h(q) is a function of the Lab transformation where q is a ratio of a given X,Yg,Z transformation standardized to its respective reference white point Xw, Yw, Zw; Q is a constant equal to 903.3; V is a digital image containing maximum RGB intensities; C is the difference between maximum RGB intensities and minimum RGB intensities; H' is a component of the hue transformation; H is the hue transformation; S is the saturation transformation; NDGB is a normalized green blue difference index; BRshift is the change in blue intensities and red intensities with consideration of green intensities; RGratio is the red intensities standardized to green intensities, and the BGratio is the red intensities standardized to blue intensities. The prior art of: Cyganek, Boguslaw. *Object detection and recognition in digital images: theory and practice*. John Wiley & Sons, 2013; Gonzalez, R. C., and R. E. Woods. *Digital Image Processing*, $3^{rd}$ edition. New York: Addison-Wesley Publishing Company, 2008; Zakaluk, R., and R. Sri Ranjan. "Artificial neural network modelling of leaf water potential for potatoes using RGB digital images: a greenhouse study." Potato Research 49, no. 4 (2006): 255-272; and Zakaluk, R., and R. Sri Ranjan. "Artificial neural network modelling of leaf water potential for potatoes using RGB digital images: a greenhouse study." Potato Research 49, no. 4 (2006): 255-272 describe techniques for visible color models and visible color model transformations. The results of an image frame grab in step 210 are a digital image defined by the multispectral bands of the color model used to define the visible region and spatial resolution of the sensor (i.e. multi-spectral camera) with spectral enhancements applied to the digital image, Eq. (1)-Eq. (24).

In this invention, a binary mask or binary image 220 containing two classes with values of 0 (background) and 1 (foreground or field of play area), is utilized to reduce the amount of data that needs to be processed in the image frame to the playing region of interest and thus: 1) reduce processing time, and 2) eliminate extraneous image values found outside of the field of play area that would otherwise affect omission and commission errors for identification of field of play markings candidates. Refer to the prior art of: Gonzalez, R. C., and R. E. Woods. *Digital Image Processing*, $3^{rd}$ edition. New York: Addison-Wesley Publishing Company, 2008 for techniques on binary masking. For example, a binary mask 220 partially covering an ice hockey rink in an image frame is produced in this invention using a polychotomous classification first containing a spectral enhancement from step 210 to detect foreground objects, Eq. (1), where m≥4.5, followed by the measurement of area for each 4-connected foreground object and each 8-connected foreground object found in the image frame. The area of the foreground object with a foreground value equal to one is classified as the binary mask covering the ice hockey rink within the image frame. To fill in holes within the binary mask, a 3×3 median filter with each structuring element equal to one is applied. Further processing of a digital image frame occurs on data found within the region covered by the binary mask. The novel use of a field of play mask in the present application is an improvement in the functioning of the computer itself, since one purpose for producing the field of play mask is to overcome the amount of image data within an image that is processed by computer memory, and hence reduce computer latency and make the computer more efficient. Another purpose for producing the field of play mask is to eliminate portions of the image that might otherwise produce omission errors (i.e. wrongly include objects as field of play markings or player objects—i.e. "false positive objects"), thereby providing an improvement in the technology of image processing itself that is particularly useful for the extraction of field of play markings and players in the sporting event context of the present application.

Field of play markings in this invention, are defined as symbols applied to the planar surface on the field of play. In ice hockey for example, field of play markings can include: blue line(s), a yellow line, a red center ice line, red face off spots, red face off circles, red hash symbols surrounding face off spots, red goal lines, red lines delineating a goalkeeper's restricted area behind the goal net, and red lines delineating a goal crease in front of the goal net. The field of play marking candidates in this invention are binary objects consisting of 4-connected foreground objects or 8-connected foreground objects with a foreground value equal to one. The field of play marking candidates are determined 220 using spectral enhancements from step 210, prior to identification 230. For example, one or more blue line candidate markings on an ice hockey sheet are created using Eq. (2) followed by Eq. (3) where f(b')≥1. In another example, yellow line candidate markings on an ice hockey sheet are created using Eq. (5) followed by Eq. (6) where f(y)≥4. A third example for creating field of play marking candidates 220 on an ice hockey sheet using spectral enhancements from step 210 includes the use of Eq. (7) within the range of 0.54≤f(r)≤0.59 to determine a red line at center ice marking candidate or red face off spot marking candidates. As a final example using an ice hockey sheet; red face circle marking candidates, red hash symbol, candidates surrounding face off spots, red goal line candidates, red line candidates delineating a goalkeeper's restricted area behind the goal net (defense line), and red line candidates delineating a goal crease in front of the goal net are determined using Eq. (8) within the range of 0.69≤f(r')≤0.99.

In cases where spectral enhancement can distinguish field of play markings candidates 220 from other objects in the image, conditional expressions are then applied to univariate object shape measures derived for each field of play marking candidate to finalize identification of field of play markings. In this invention, univariate object shape measures, Eq. (25)-Eq. (42), are region properties used to set field of play marking candidates apart from one another.

$$\text{area of object } (A) = \sum_{i=0}^{n} I, \text{ where: } I \text{ is a foreground connected pixel for an object, } n \text{ is the maximum number of pixels} \quad \text{Eq. (25)}$$

$$\text{minor axis length } (\ell) = \text{minimum length (in pixels) of the smallest ellipsoid bounding a field of play marking candidate} \quad \text{Eq. (26)}$$

$$\text{major axis length } (\mathcal{L}) = \text{maximum length (in pixels) of the smallest ellipsoid bounding a field of play marking candidate} \quad \text{Eq. (27)}$$

$$\text{major axis orientation } (L) \text{ relative to the } x\text{-axis } (-90° \text{ to } 90°) \quad \text{Eq. (28)}$$

$$\text{solidity } (\Upsilon) = \frac{A}{\text{convex area}} \quad \text{Eq. (29)}$$

$$\text{eccentricity } (\varepsilon) = (\text{minor axis length})/(\text{major axis length}) \quad \text{Eq. (30)}$$

$$\text{perimeter } (P) = \text{sum of pixels with one or more background neighbors} \quad \text{Eq. (31)}$$

$$\beta_{minX} (\text{minimum } X \text{ bounds}) = X\max - X\min \quad \text{Eq. (32)}$$

$$\beta_{minY} (\text{minimum } Y \text{ bounds}) = Y\max - Y\min \quad \text{Eq. (33)}$$

$$\text{extent } (\epsilon) = \frac{A}{\beta_{minX} \times \beta_{minY}} \quad \text{Eq. (34)}$$

$$\text{Aspect ratio } (ar) = \frac{\beta_{minX} + 1}{\beta_{minY} + 1} \quad \text{Eq. (35)}$$

$$\text{bounds } (\beta) = \frac{A}{minorAxisLength} \quad \text{Eq. (36)}$$

$$\text{elongation} = \frac{A}{P} \qquad \text{Eq. (37)}$$

$$\text{equivalent diameter } (d) = \sqrt[2]{\frac{4A}{\pi}} \qquad \text{Eq. (38)}$$

$$\text{extent area ratio } (\varepsilon A) = \frac{A}{\beta_{minX} \times \beta_{minY}} \qquad \text{Eq. (39)}$$

$$\text{equivalent bounds} = \frac{\sqrt[2]{\frac{4A}{\pi}}}{majorAxisLength} \qquad \text{Eq. (40)}$$

$$\text{flatness} = \frac{4\pi A}{perimeter^2} \times \varepsilon \qquad \text{Eq. (41)}$$

$$\text{thinness ratio } (\tfrac{1}{T}) = 4\pi A / P^{\wedge} 2 \qquad \text{Eq. (42)}$$

Figure 4:
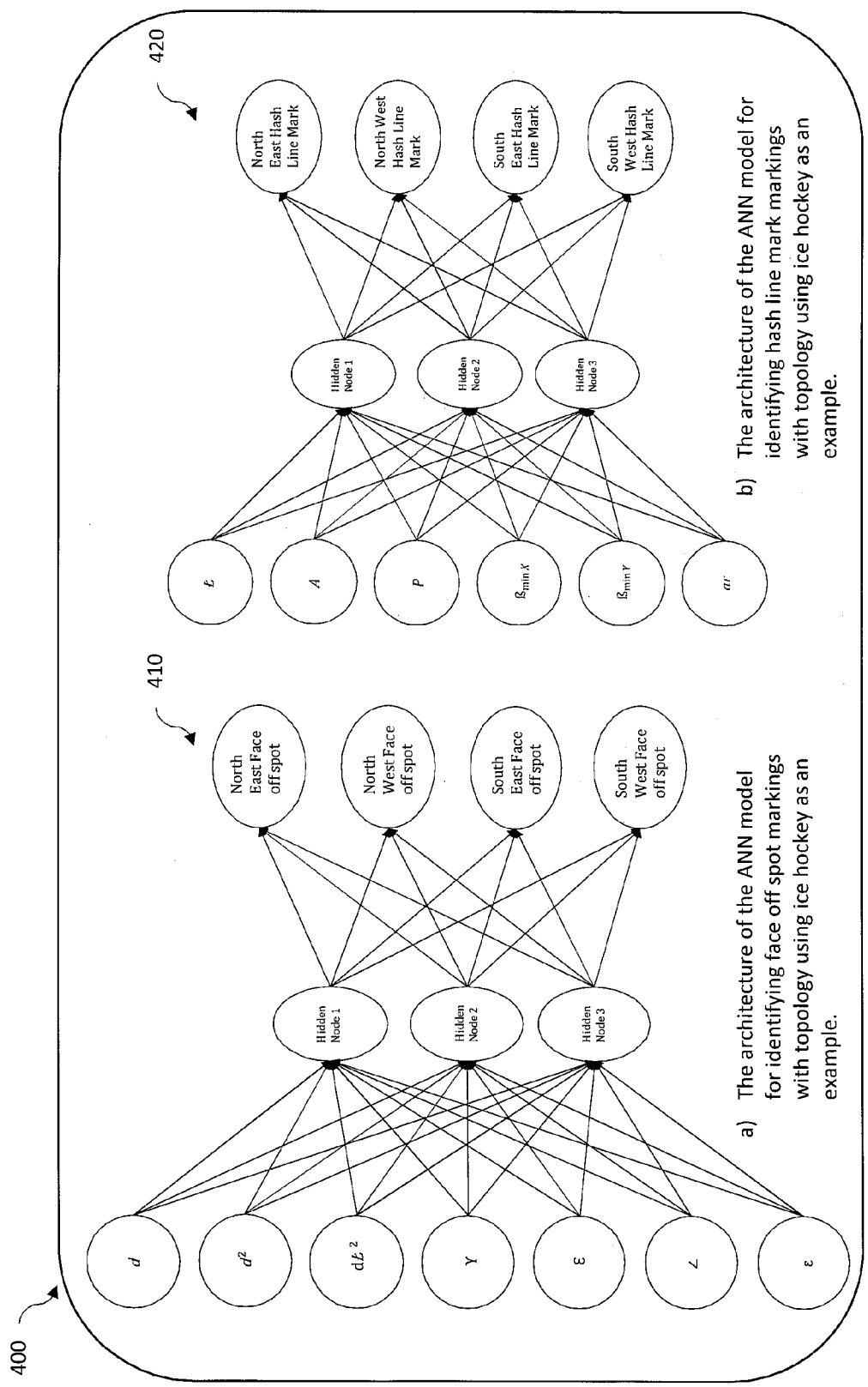
FIG. 4 depicts the architecture of an ANN model for identifying face off spot markings with topology and the architecture of an ANN model for identifying hash line marks with topology, using ice hockey as an example.

The prior art of Marques, Oge. *Practical Image and Video Processing Using Matlab*. Hoboken, N.J.: John Wiley & Sons, 2011 clarifies elements used in the present invention to create the univariate object shape measures that extract said field of play marking object candidates. After determining the univariate object shape measurements and applying conditional expressions, each field of play marking is a unique, numerically labelled object located at a set of coordinate pair(s) defined by the row and column dimensions of the respective image frame. Using ice hockey as an example, field of play markings such as a yellow line Y(xy), a blue line on the west side of the ice hockey rink Bw(xy), a blue line on the east side of the ice hockey rink Be(xy) a center line R(xy), a goal line G(xy), and a defense line D(xy) are identified from conditional expressions applied to univariate object shape measures of player object candidates using Eq. (43)-Eq. (48), respectively.

$$Y(xy) = \begin{cases} \varepsilon \geq 0.970 & \text{if } f(y) \geq 4 \\ 0 & \text{otherwise} \end{cases} \qquad \text{Eq. (43)}$$

$$Bw(xy) = \begin{cases} \varepsilon \geq 0.990 \cap \beta \geq 10 & \text{if } f(b') \geq 1 \cap L \geq 40 \\ 0 & \text{otherwise} \end{cases} \qquad \text{Eq. (44)}$$

$$Be(xy) = \begin{cases} \varepsilon \geq 0.990 \cap \beta \geq 10 & \text{if } f(b') \geq 1 \cap L \leq -40 \\ 0 & \text{otherwise} \end{cases} \qquad \text{Eq. (45)}$$

$$R(xy) = \begin{cases} \varepsilon \geq 0.999 \cap L \geq 82 \cap \beta \geq 10 & \text{if } 0.54 \leq f(r) \leq 0.59 \\ 0 & \text{otherwise} \end{cases} \qquad \text{Eq. (46)}$$

$$G(xy) = \qquad \text{Eq. (47)}$$
$$\begin{cases} \varepsilon \geq 0.999 \cap \beta \geq 10 \cap L \geq |20°| & \text{if } (0.54 \leq f(r) \leq 0.59) \\ 0 & \text{otherwise} \end{cases}$$

$$D(xy) = \qquad \text{Eq. (48)}$$
$$\begin{cases} \varepsilon \geq 0.999 \cap \beta \geq 10 \cap (22° \leq L \leq 23°) & \text{if } (0.54 \leq f(r) \leq 0.59) \\ 0 & \text{otherwise} \end{cases}$$

Where conditional expressions using both spectral enhancement and univariate shape measurements do not identify field of play markings, field of play markings are identified by Artificial Neural Network (ANN) modelling 230. In this instance, ANN models apply a supervised, feedforward, back error-propagation approach trained using a combination of input neurons, including but not limited to, spectral enhancements, Eq. (1)-Eq. (24), and univariate shape measures, Eq. (25)-Eq. (42), that describe image objects for each of the field of play marking candidates 220. The architecture for each field of play marking identification ANN model utilize, but are not limited to, a multilayer perception architecture with three layers (input, hidden, and output layer) trained on 70% of a given field of play marking objects dataset and cross-validated on 30% of the remaining field of play marking objects dataset. The training dataset and validation dataset are randomly selected from the original dataset. The hidden layer uses, but is not limited to, a sigmoid hyperbolic tangent (tan H) activation function consisting of three or more neurons, each with a range normalized from −1 to 1. The output of the ANN model contains one or more layers indicating a probability result ranging from 0 (no association with a field of play marking) to 1 (a strong association with a field of play marking). The dataset used as input neurons in the ANN model can be different from the original dataset used to train the ANN model. The ANN models can be applied across multiple image frames and across multiple games. The application of supervised ANN models is described in the prior art of: Duda, R. O., P. E. Hart, and D. G. Stork. *Pattern Classification, 2nd edition*. New York, N.Y.: John Wiley & Sons, 2001; Fausett, Laurene. *Fundamentals of Neural Networks: Architectures, Algorithms And Applications, 1st Edition*. Englewood Cliffs, N.J.: Prentice-Hall, 1994; Haykin, Simon. *Neural Networks A Comprehensive Foundation, 2nd edition*. Upper Saddle River, N.J.: Prentice-Hall, 1999; SAS Institute. Jmp Version 5 Statistics and Graphics Guide. Cary, N.C.: Statistical Analysis System, 2002. Using ice hockey as an example (FIG. 4), the input layer for a face off spot identification ANN model (410) consists of univariate shape measures for numerically labeled field of play marking candidates derived from Eq. (8) within the range of $0.69 \leq f(r') \leq 0.99$. An association level ($\geq 0.9$) is used to identify face off spot markers from the output neurons. Another example using ice hockey (420) depicts the ANN model architecture to identify hash line markings that surround face off spots using univariate shape measures for hash line marking candidates found by Eq. (8) within the range of $0.69 \leq f(r') \leq 0.99$. An association level ($\geq 0.9$) is used to identify hash line markers from the output neurons.

Where spectral enhancement and univariate shape measures with conditional expressions omit field of play markings or where spectral enhancement and univariate shape measures applied in an ANN model omit field of play markings 230, the Radon transform (Deans, Stanley R. *The Radon transform and some of its applications*. Courier Corporation, 2007; and, Helgason, Sigurdur. "The Radon Transform on R n." In Integral Geometry and Radon Transforms. Springer New York, 2011) is used to identify field of play markings. For example, to identify goal lines in ice hockey, the Radon transform is applied, with an input orientation range ($0° \leq \theta \leq 90°$), to results of a binary image derived by Eq. (24). Final identification for a goal line using the Radon transform approach then occurs by selecting, but not limited to, the top three peaks found in two-dimensional Radon transform space.

To finalize identified field of play markings, they are processed using morphological operations 230 to produce a set of coordinate pairs defined by the row and column dimensions of the respective image frame. In this invention, morphological operations include, but are not limited to: erosion, dilation, opening, closing, hit or miss, top hat, bottom hat, boundary extraction, thinning, spur removal, cleaning, region filling, thickening, and skeletonization (Marques, Oge. *Practical Image and Video Processing Using Matlab*. Hoboken, N.J.: John Wiley & Sons, 2011.).

Figure 3:
FIG. 3 depicts a table showing morphological operations, in order of use, applied to field of play markings, using ice hockey as an example.

Using ice hockey as an example, (FIG. 3) denotes with a "✓" the morphological operation, in order of use, applied to a given field of play marking. Each morphological operation uses a structuring element of ones. The final result of morphological operations is a set of unique field of play markings, located at a set of coordinate pair(s) defined by the row and column dimensions of the respective image frame.

Figure 5:
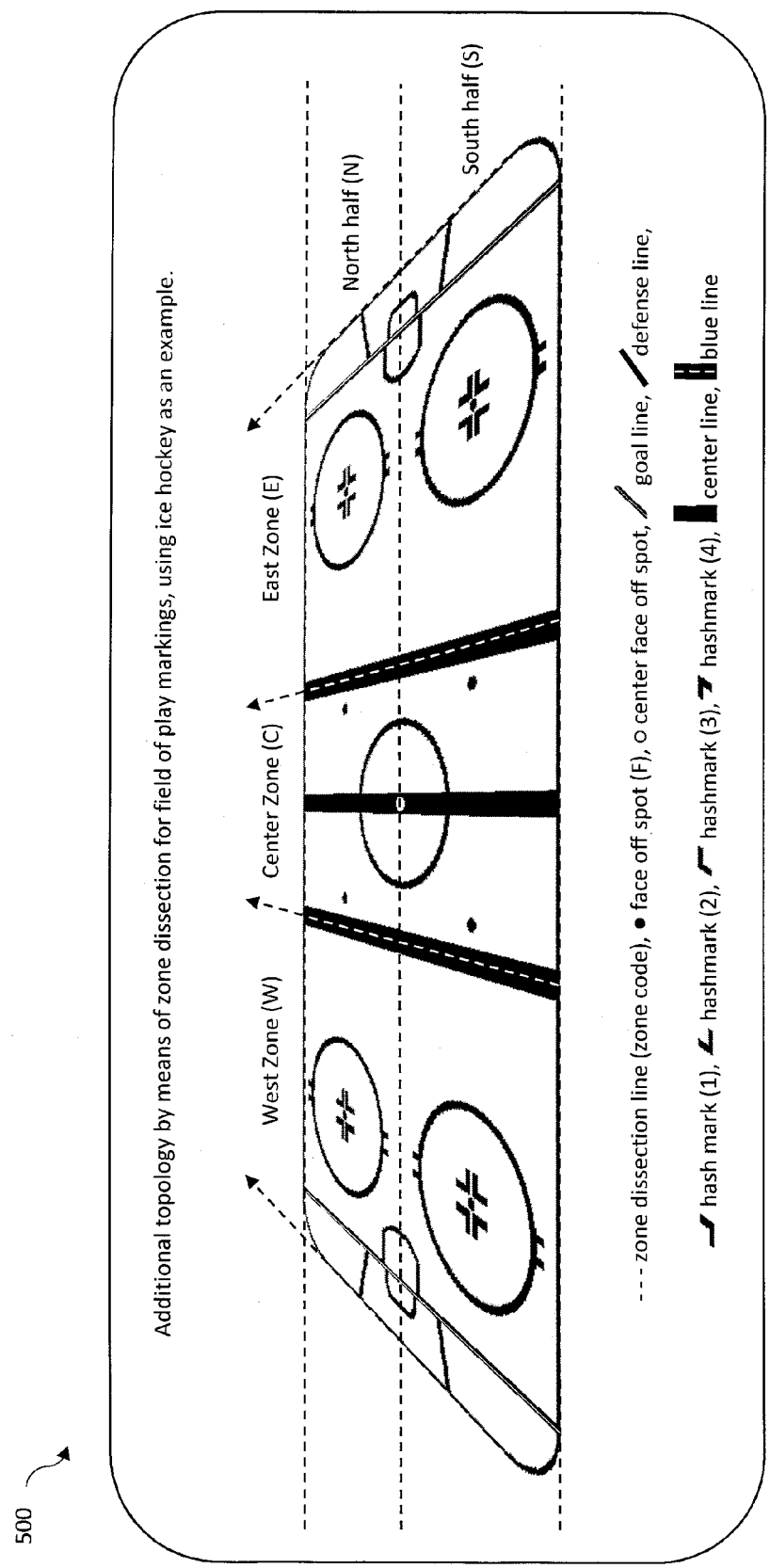
FIG. 5 depicts additional topology by means of zone dissection, using ice hockey as an example.

With the completion of morphological operations, topology or spatial awareness for field of play markings then occurs in step 230 by nominal scaling (DeMers, Michael. *Fundamentals of Geographical Information Systems, 4th edition*. New York, N.Y.: John Wiley & Sons, 2009). The approach used to build topology for a field of play marking is based on the identification of field markings from other objects in the image: unique to a conditional expression Eq. (43)-Eq. (48), unique to an ANN model (FIG. 4), or unique to a Radon transform. Field of play marking topology is further built using the perspective positions for field of play markings relative to each other within the row and column dimensions of the respective image frame and the orientation ($\angle$) of the field of play markings within the respective image frame. Building topology coincides with dissecting the field of play into playing zones common to the type of sporting event as well as a north half section and a south half section. Using ice hockey as an example, when a red center line is identified, R(xy) is true, the topology for the red center line would be labelled as "RC" using nominal scaling. If a Blue line West is identified, Bw(xy) is true, then the blue line topology is labelled as "BW" using nominal scaling. If a Blue line East is identified, Be(xy) is true, then the blue line topology is labelled as "BE" using nominal scaling. A Face off spot, F(xy), is also further defined by zone location. When Bw(xy) is true and F(xy) is true, then the Face off spot is determined to be located in the West zone of the ice hockey rink only if the x coordinate of the Face off spot F(x) is less than the x coordinate of the West Blue line (F(x)<Bw (x)) and is then assigned a label "FW" for topology. A Face off spot is assigned a label "FE" for topology when Be(xy) is true and F(xy) is true and F(x)>Be(x). The topology for a Face off spot can be further defined to be located either at the North or South half of the rink (FIG. 5) by comparing the image frame y coordinate of each face off spot F(y) to one another. For example, if FE(n)=2 and $FE_1(y) \geq FE_2(y)$, where n is the number of Face off spots, then $FE_1$ is located at the South half of the rink and would be assigned a label "FSE" for topology and $FE_2$ is located at the North half of the rink and would be assigned a label "FNE" for topology. A Hash line mark in ice hockey, H(xy), can also be further defined to be either on the North or South side of the rink (FIG. 5) by comparing the image frame y coordinate of each identified Hash line mark centroid H($\bar{y}$) to the grand mean of all image frame y coordinates for all Hash line mark centroids H($\bar{\bar{Y}}$) identified in the image. If H($\bar{y}$)>H($\bar{\bar{Y}}$) then the Hash line mark is located on the South half of the ice hockey rink. Likewise, if H($\bar{y}$)<H($\bar{\bar{Y}}$) then the Hash line mark is located on the North half of the ice hockey rink. The final result of topology assignment is a set of unique field of play markings, located at one or more coordinate pairs defined by the row and column dimensions of the respective image frame, each labelled using a nominal scale.

Figure 6:
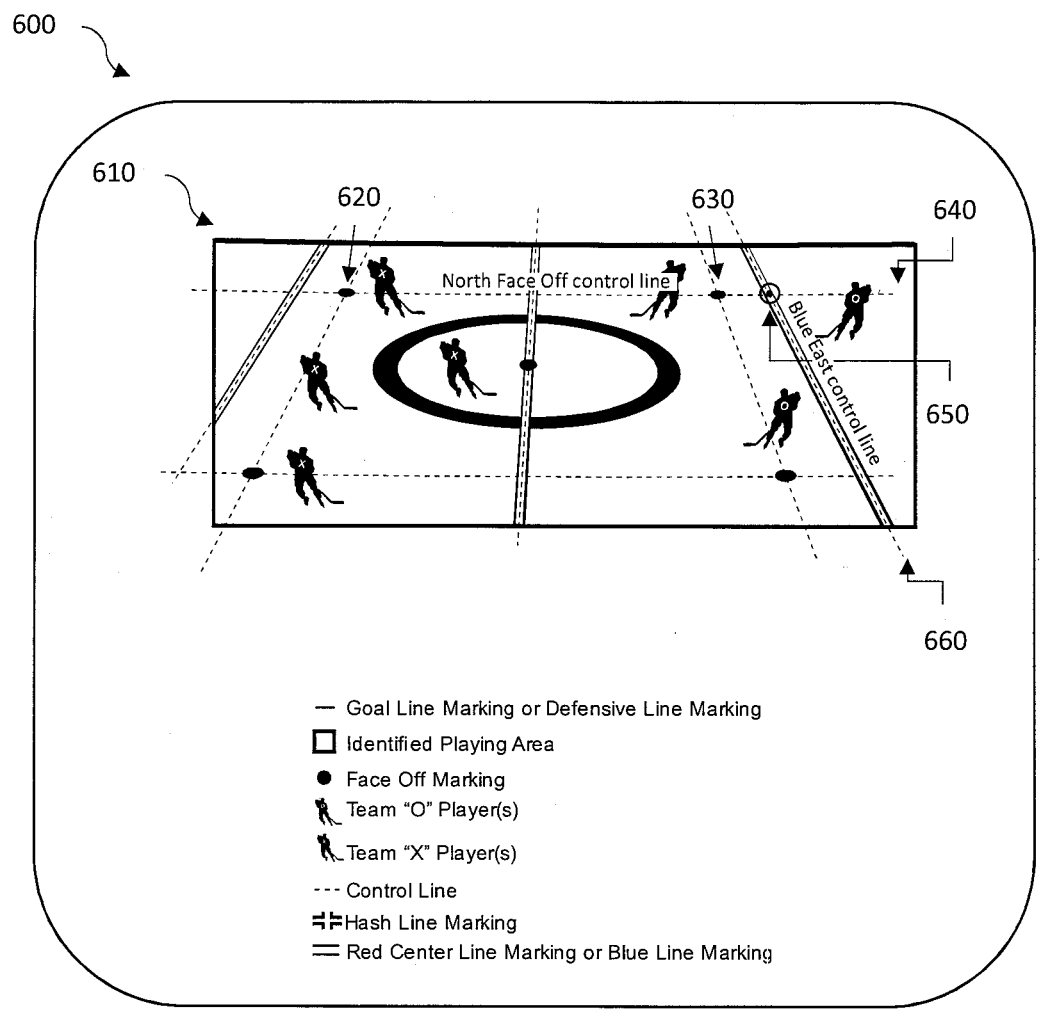
FIG. 6 depicts ice hockey markings detected in the neutral zone of an image frame with modelled control lines, and control line intersections.

After the field of play markings with topology are built, an image control point (ICP) dataset is created 240. Image control points are created by either using the centroid for a field of play found by morphological processing 230 or by the intersection of control lines derived from field of play markings. To create image control points using the intersection of control lines, control line equations are first defined by modelling the row (y) and column (x) image frame coordinates of two or more field of play marking combinations identified from the image frame using polynomial regression. For example, a line can be defined using first order polynomial regression, described by the equation y=mx+b, consisting of a slope (m), an independent x, a dependent y, and an intercept (b) coefficients derived from two or more xy points (Burt, J. E., and G. M. Barber. *Elementary Statistics for Geographers, 2nd Edition*. New York, N.Y.: The Guilford Press, 1996; and, Calter, Paul. *Technical Mathematics with Calculus, SI Edition*. Scarborough, Ontario: Prentice-Hall Canada, 1998). An image control point (ICP) is found by setting the y-intercept from one control line equation with another control line equation and solving for x. The solution for x is then substituted back into either of the control line equations to find the intersecting y image control point. Prior to intersection, control line equations are tested to ensure that the control lines are not parallel with each other, the control lines are not vertical, or describe the same control line (Lloyd, Christopher. *Spatial Data Analysis: an introduction for GIS users*. New York: Oxford University Press, 2010). The topology associated with the field of play markings used to build the control line equations is concatenated with the intersection of the control lines resulting in a labelled ICP. Control lines are built for all field of play marking combinations identified in the image. The result is an ICP dataset consisting of xy image coordinates with topology labels for each field of play marking centroid identified in the image and xy image coordinates with topology labels derived from the intersection of control lines. If fewer than four image control points are determined, then the image is discarded and where another image frame exists in the video, the object detection subsystem 200 returns to step 210. Using ice hockey field of play markings at center ice as an example (FIG. 6), the first order polynomial regression equation for a near-horizontal North Face off spot control line 640 is defined by the centroid of the North-West Face off spot with topology designated as "FNW" 620 and centroid of the North-East face off spot with topology designated as "FNE" 630 within the xy image frame coordinate space 610 resulting in a topology label of 'FNWFNE'. Likewise, the first order polynomial regression equation for the near-vertical Blue East control line 660 with topology designated as "BE" is defined by morphologically processed line segment xy image coordinate pairs (FIG. 3) extracted by Eq. (45). An ICP is then determined by intersecting the near-horizontal North Face off spot control line "FNWFNE" with the near-vertical Blue East control line "BE" using their respective first order polynomial regression line equations 650 and then concatenating their respective topology labels "FNWFNEBE." If four or more image control points are located in an image frame, image control points with topology labels are intersected with a user-defined xy planimetric reference control point (RCP) dataset containing the same topology labels that correspond to the field of play markings identified in an image and same topology labels that correspond to the intersection of control lines derived from field of play markings identified in an image. "Intersecting" in this case refers to creating a subset of the RCP dataset using the same topology found in the respective ICP dataset. The result is a dataset of ICP locations paired with RCP locations 240. Points, lines, and intersections of lines and their respective application in the context of projective photogrammetry is found in the prior art of: Hallert, Bertil. *Photogrammetry: Basic Principles and General Survey*. New York: McGraw-Hill Book Company, 1960.

Using a two-dimensional direct linear transformation (DLT) with normalization, a projective transformation model 250 is then created from the paired ICP dataset and RCP subset 240. Normalization of the ICP and RCP dataset consists of translating locations such that their centroid location is at the origin and then scaling them to an average distance of $\sqrt{2}$. The normalized DLT projective transformation model for a given image frame is automatically built through iteration of the ICP-RCP dataset. The process initializes with the calculation of the normalized DLT projective transformation model on all ICP-RCP paired locations in the dataset followed by calculation of the normalized root mean square error (NRMSE) for both the X ICP-RCP paired locations and Y ICP-RCP paired locations. The root mean square error is normalized by the standard deviation of the observations where the output of the NRMSE ranges from 0 (bad fit) to 1 (a perfect fit). If the NRMSE for both the X ICP-RCP paired locations and Y ICP-RCP paired locations meets a threshold (NRMSE≥0.93) then stage 250 is complete. Iteration occurs if the NRMSE for both X ICP-RCP paired locations and Y ICP-RCP paired locations falls below a threshold (NRMSE≥0.93). At each iteration, one XY ICP-RCP paired location with the lowest (NRMSE) fit in either the X location or Y location is dropped and the normalized DLT projective transformation model is recalculated. Iteration continues until a threshold (NRMSE≥0.93) for the remaining ICP-RCP dataset is met or fewer than four ICP-RCP locations are remaining in the ICP-RCP dataset. If a threshold (NRMSE≥0.93) is reached and four or more ICP-RCP locations are remaining in the ICP-RCP dataset, the normalized DLT projective transformation model recalculated from the last iteration completes stage 250 otherwise, the image frame is rejected and the object detection subsystem returns to step 210. For disclosures describing a two-dimensional DLT projective model and normalization of control points prior to creating a DLT projection, refer to the prior art of: Hartley R. I., and A. Zisserman. *Multiple View Geometry in Computer Vision, 2$^{nd}$ edition*. Cambridge, UK: Cambridge University Press, 2004.

Figure 7:
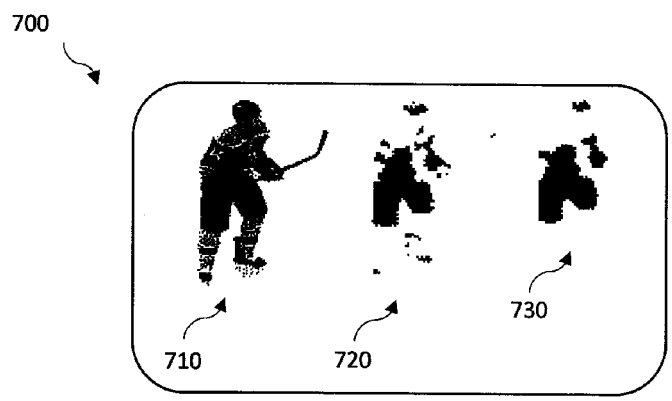
FIG. 7 depicts player fragments, using ice hockey as an example.
Figure 8:
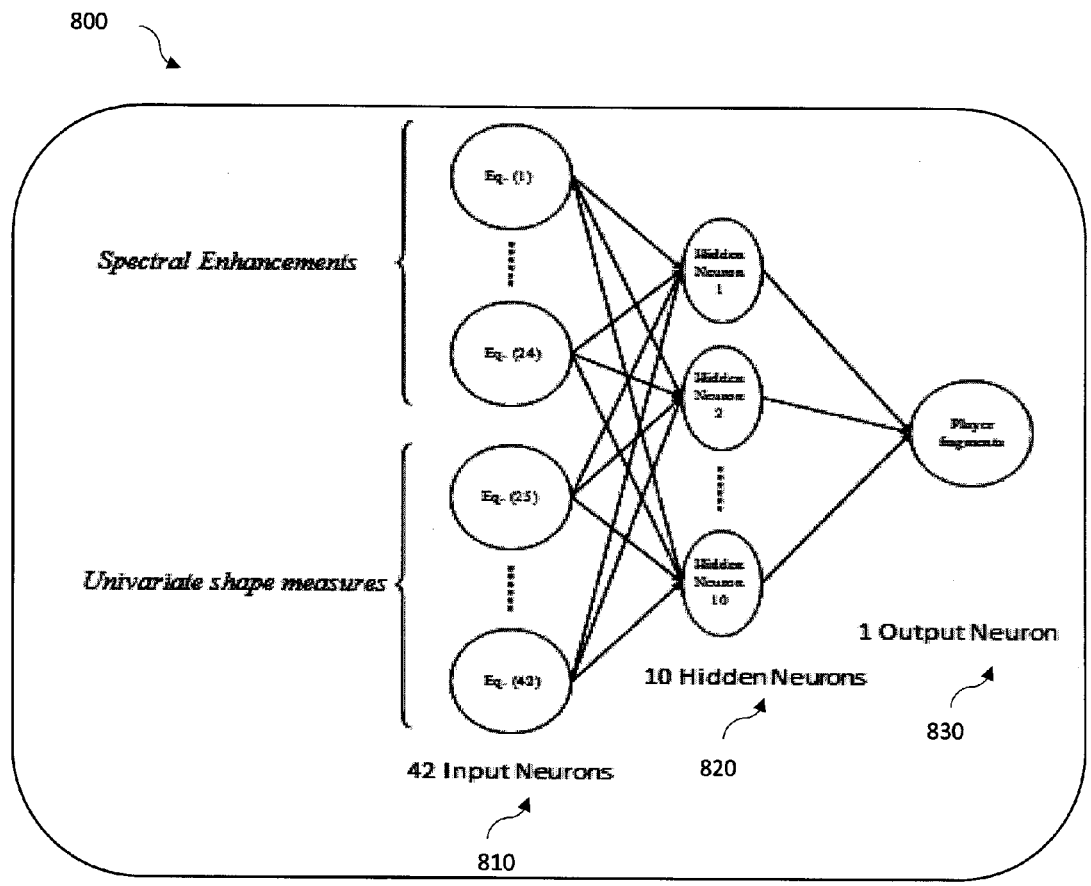
FIG. 8 depicts the architecture of an ANN model for identifying player fragments, using ice hockey as an example.
Figure 9:
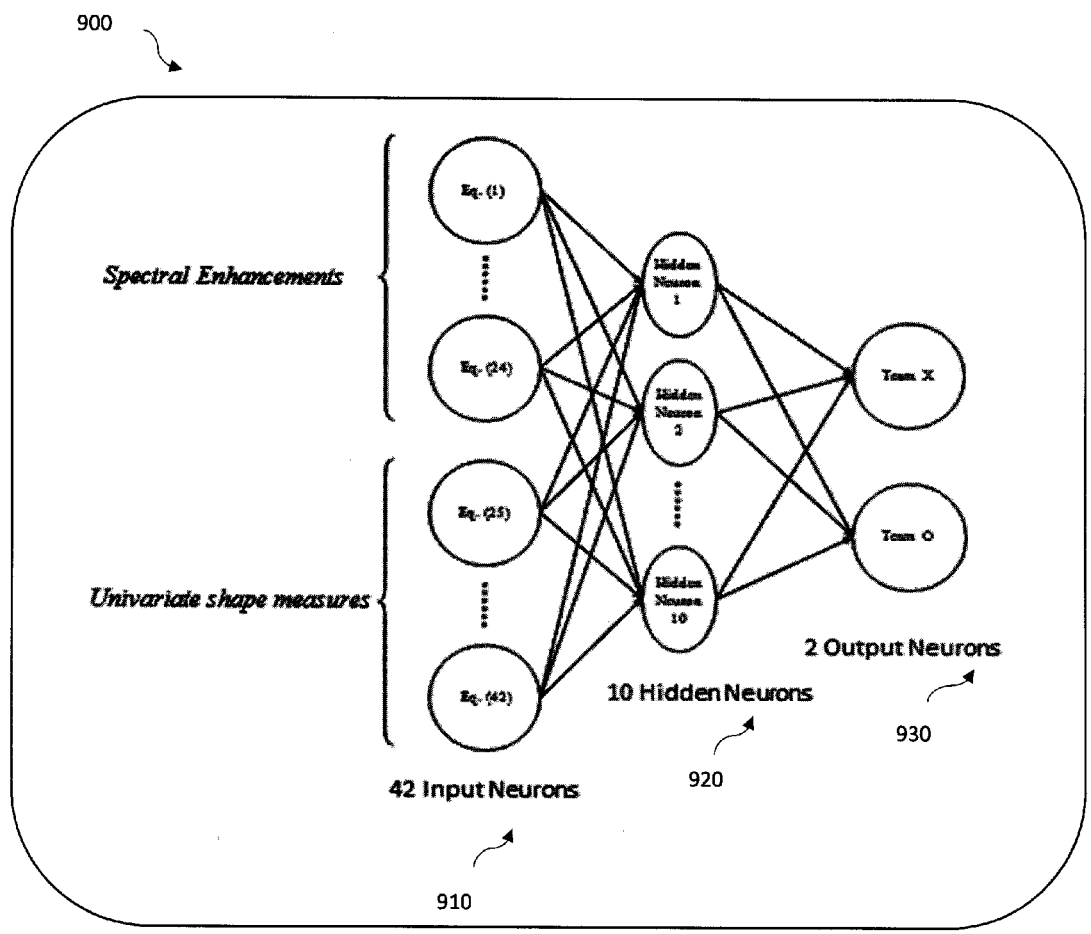
FIG. 9 depicts the architecture of an ANN model for identifying the team of player fragments, using ice hockey as an example.

The next step to be performed within the object detection subsystem 200 is to identify player object candidates and player fragments locations in the image frame 260. Player object candidates in the image frame are identified within the area covered by the binary mask 220 using a polychotomous classification by means of Eq. (4) followed by a median filter to close and fill player object candidate regions. Using an ice hockey player as an example (FIG. 7), the spectral transformation K≥0.8 identifies player object candidates 720 from the player 710, followed by a 7×7 median filter (with all 7×7 elements set to one) to close and fill player object candidate regions 730. To finalize player fragment identification, an ANN Model is applied (FIG. 8). The mean intensities from Eq. (1)-Eq. (24) within each player object candidate region and univariate object shape measures from Eq. (25)-Eq. (42) for each player object candidate region are created and used as input neurons in a supervised ANN model 260 to identify player fragments. The player identification ANN model is developed using a supervised, feedforward, scaled conjugate gradient back error-propagation approach with a multilayer perception architecture. The hidden layer uses a sigmoid activation function consisting of three or more neurons, each with a range normalized from 0 to 1. Results of the output layer contain a probability result ranging from 0 (fragment has no association with a player) to 1 (fragment has a strong association with a player). The dataset used as input neurons in the ANN model can be different from the original dataset used to train the ANN model. The ANN models can be applied across multiple image frames and across multiple games. Using ice hockey as an example, the player fragment identification ANN model (FIG. 8) consists of 42 input neurons 810, 10 hidden neurons 820, and 1 output neuron 830 trained on 70% of a dataset containing mean intensities within each player object candidate region from Eq. (1)-Eq. (24) and univariate shape measures of each player object candidate region from Eq. (25)-Eq. (42), cross-validated on 15% of the dataset, with 15% of the remaining dataset used for testing the ANN model. An association level (≥0.9) is used to identify and select player fragments from the output neuron. The ice hockey output neuron player fragments results include, but are not limited to: skates, pants, legs, arms, gloves, jerseys, shoulders, heads, or helmets 830. Following identification of player fragments, another ANN model determines the players by team (FIG. 9). The team identification ANN model is developed using a supervised, feedforward, scaled conjugate gradient back error-propagation approach with a multilayer perception architecture. The input layer includes, but is not limited to spectral enhancements Eq. (1)-Eq. (24), and univariate shape measures Eq. (25)-Eq. (42). The hidden layer uses a sigmoid activation function consisting of three or more neurons, each with a range normalized from 0 to 1. The two output neurons, one output neuron for team "X" and one output neuron for team "O" of the team identification ANN model, are normalized where the range of an output neuron in the output layer contain a probability result ranging from 0 (the player fragment has no association with a given team) to 1 (the player fragment has a strong association with a given team). The team identification ANN model can be applied across multiple image frames and across multiple games. Using ice hockey as an example (FIG. 9), 42 input neurons for the team identifier ANN model 910 are applied to each player fragment with 10 hidden neurons 920, and 1 output neuron for each team 930. For each team output neuron 930, an association level (≥0.9) is used to identify the team associated with player fragments.

Figure 10:
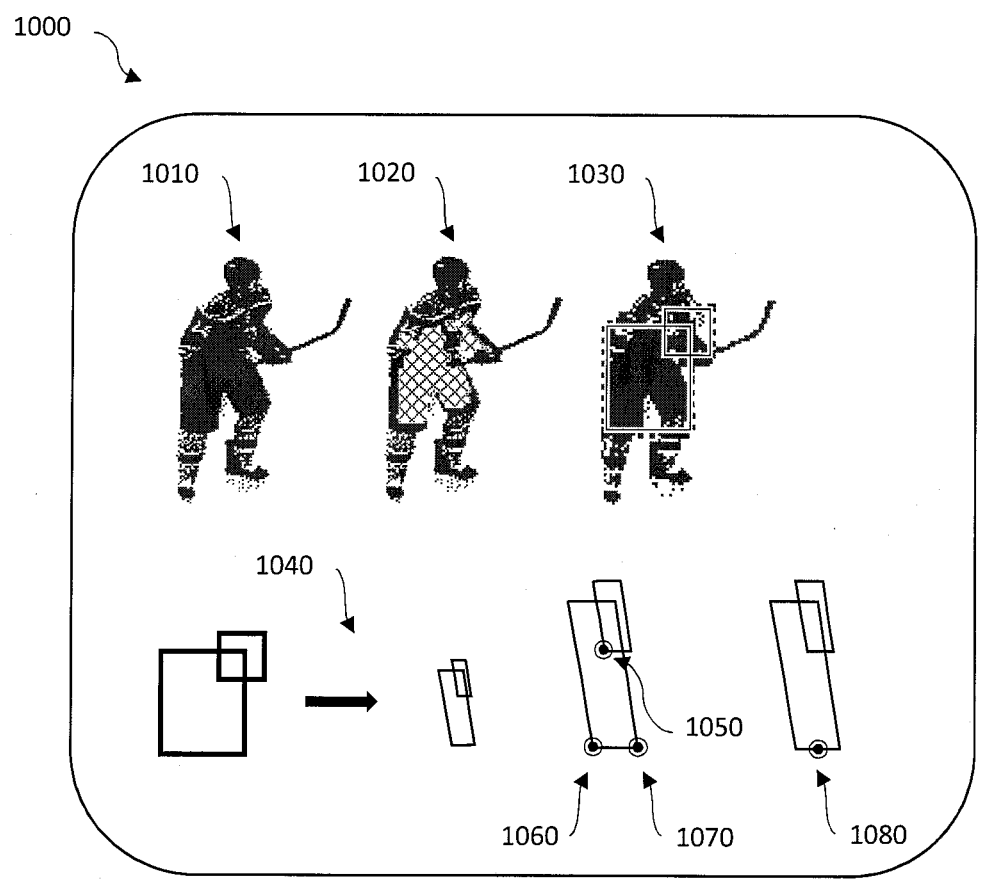
FIG. 10 depicts aggregation of player fragments by bounding box overlap, using an ice hockey player as an example.

With player fragment by team identification complete 260, the perspective projection transformation model is applied to the locations of player fragments and aggregated into single player locations by team 270. To fulfill this step of the invention, the bounding box property for player fragments by team is found. The four corner points for the bounding boxes are then transformed from their perspective image row and image column locations in the image frame to planimetric XY Cartesian locations, defined by the field of play, using the perspective projection transformation model 250. To identify individual players by team, the bounding boxes of the player fragments on each team are then compared for any overlap using a point in polygon approach where the four corner points of a given projected bounding box for a player fragment on a team are compared with all other projected polygon bounding boxes, defined by their respective corner points, for all player fragments on the same team. Where at least one corner point of one bounding box is found within another polygon bounding box, the bounding boxes overlap, and the player fragments are then aggregated into an individual player on that team. The mean for the two corner points from the lowest bounding box of the aggregated player fragments are then defined as the location for the player. Using ice hockey as an example (FIG. 10), an ice hockey player 1010, is identified by player fragments on a team 1020 using the player fragment identification ANN model (FIG. 8) followed by team identification (FIG. 9). Next, the bounding boxes of the player fragments are found 1030. Using the four corner points of the bounding boxes, the bounding boxes are then transformed to the XY Cartesian plane that defines the field of play using the perspective projection transformation 1040. Where a corner point of one bounding box of a player fragment on a team falls within the boundary of another bounding box of a player fragment on the same team 1050, the player fragments are aggregated together. The player is then located by averaging the lower left corner point (X=72.4, Y=49.8) 1060 with the lower right corner point (X=74.5, Y=49.8) 1070 of the lowest bounding box of the player fragment that formed the player (X=73.5, Y=49.8) 1080.

Figure 11:
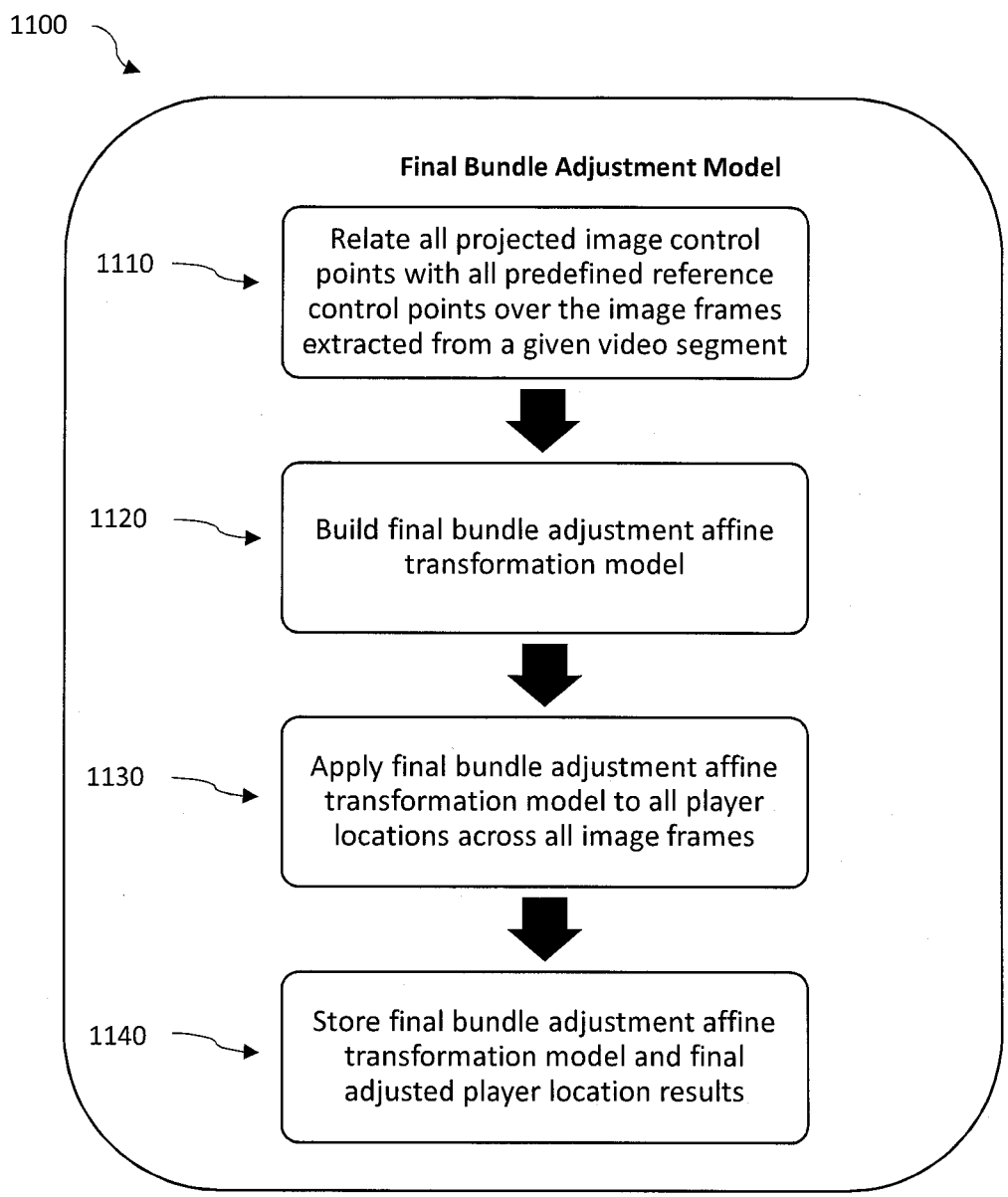
FIG. 11 depicts a flowchart of the final bundle adjustment process that occurs after all image frames extracted from a video segment have been processed.

In the final stage of the image frame life cycle 280, player locations, team identifier, the projective transformation model, control points, rink topology, and image frame identifier are saved to a file and stored on the computer 120. The life cycle of an image frame 200 is now complete. Once all image frames in a video segment, defined by the duration of play, are processed using the life cycle 200 steps, a final bundle adjustment model 1100 is applied (FIG. 11). The duration of the play can be defined as, but is not limited to: a number of image frames, fixed time intervals, time between whistles, time between penalties, periods, quarters, time within a video sequence, image frame number within a video sequence, duration of puck possession by player or duration of puck possession by team. The final bundle adjustment 1100 stage produces an affine transformation model (Marques, Oge. *Practical Image and Video Processing Using Matlab.* Hoboken, N.J.: John Wiley & Sons, 2011) 1120 by automatic iteration of field of play projected image control point $ICP_p$ locations paired with their respective RCP locations across all image frames in the video segment 1110 processed in the life cycle 200 steps. The stage is initialized by calculating the affine transformation model for all paired $ICP_p$-RCP locations across all image frames in the video segment 1110 processed in the life cycle 200 steps. The affine transformation model in this stage 1120 outputs adjusted field of play locations for scaling [a0=sx, a1=0, a2=0, b0=0, b1=sy, b2=0] translation by [a0=1, a1=0, a2=dx, b0=0, b1=1, b2=Δy] and rotation [a0=cos ϑ, a1=sin ϑ, a2=0, b0=−sin ϑ, b1=cos ϑ, b2=0]. The NRMSE for both X and Y observations is then evaluated against a NRMSE threshold (NRMSE≥0.90). The root mean square error is normalized by the standard deviation of the observations where the output of the NRMSE ranges from 0 (bad fit) to 1 (a perfect fit). If the NRMSE threshold is met for both X and Y observations (NRMSE≥0.90), then the affine transformation is final 1120 and applied to the planimetric locations of all players across all image frames in the image segment 1130 processed in the life cycle 200. If the NRMSE threshold (NRMSE≥0.9) is not met, an iterative process begins whereby the $ICP_p$-RCP paired location with the worst NRMSE in either the X or Y direction of the $ICP_p$-RCP paired location dataset is dropped and the affine transformation is recalculated. Iteration continues until the NRMSE threshold (NRMSE≥0.90) in both the X direction and Y direction is met or until 90% of the initial number of $ICP_p$-RCP paired locations remain in the $ICP_p$-RCP dataset. The final bundle adjustment model is then applied to the planimetric locations of all players across all image frames in the image segment 1130 processed in the life cycle 200. The final bundle adjustment 1100 corrects positional errors resulting from the perspective projection models derived for each image frame in the video segment. The final bundle adjustment model 1120 and final adjusted player locations are then stored 1140 on the computer 120 for player analysis 140.

Figure 12:
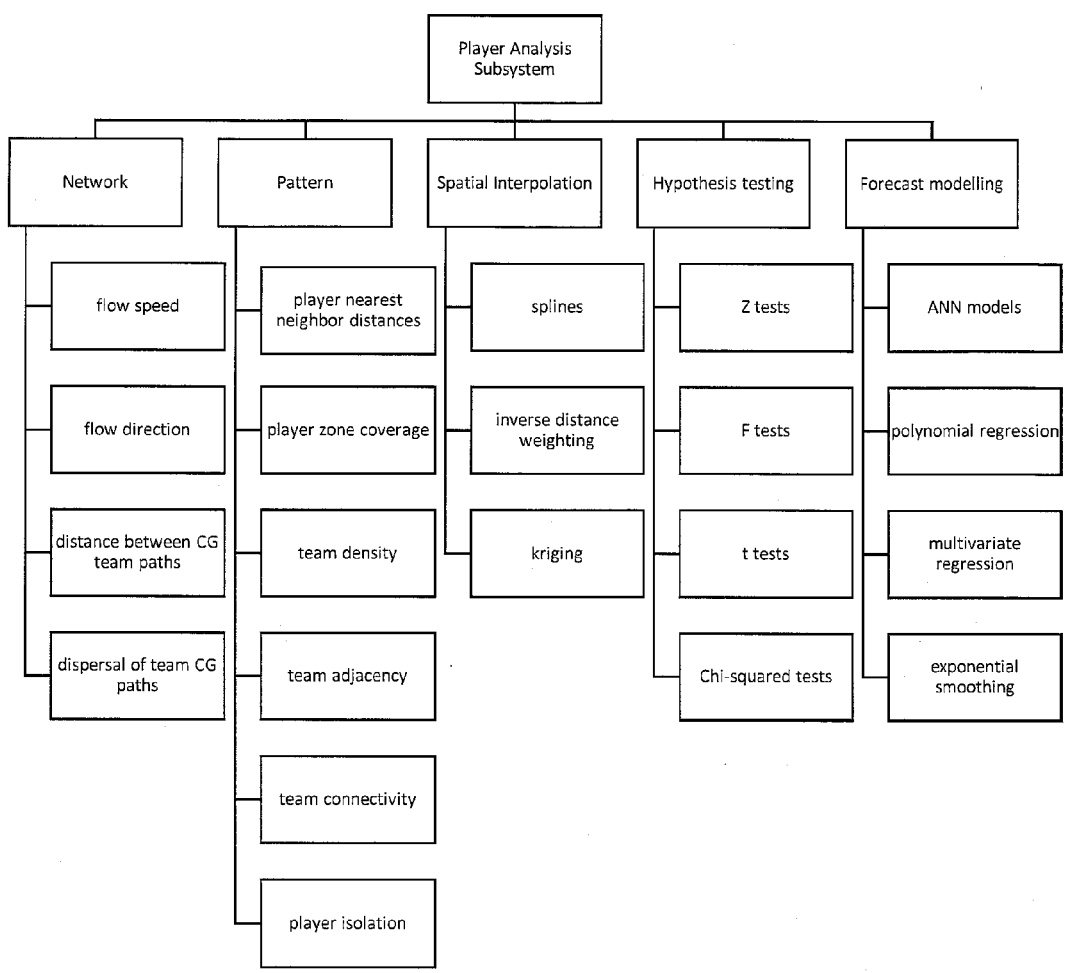
FIG. 12 depicts the categories of analysis that can be applied to player locations using the player analysis subsystem
Figure 14:
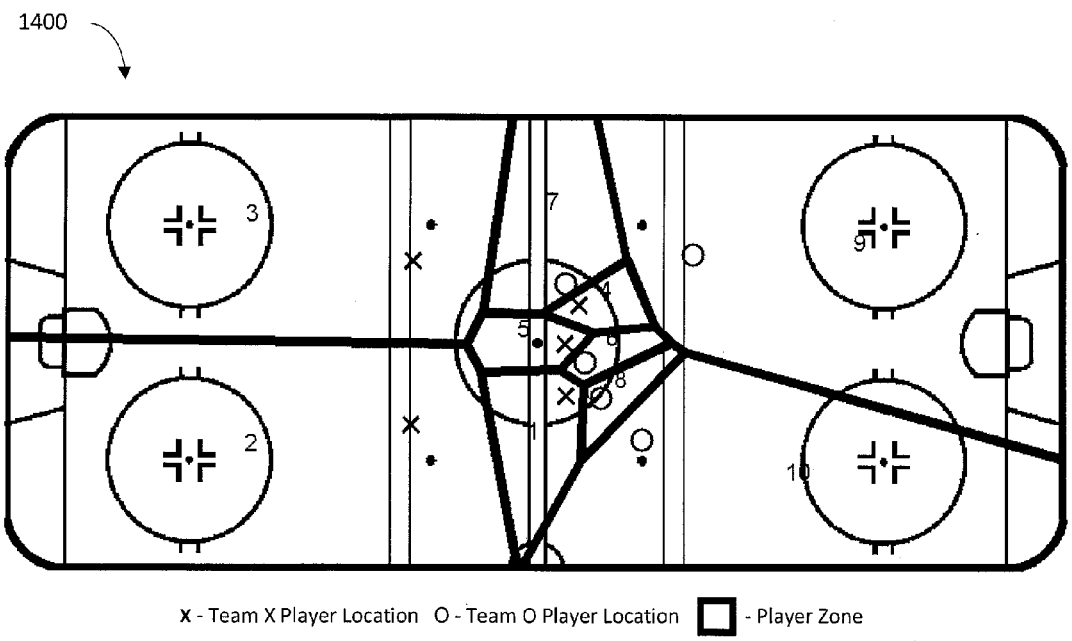
FIG. 14 depicts a cartographic report produced in the reporting subsystem, using ice hockey as an example, determined using the player analysis subsystem, showing the zones between projected players on the ice rink.
Figure 15:
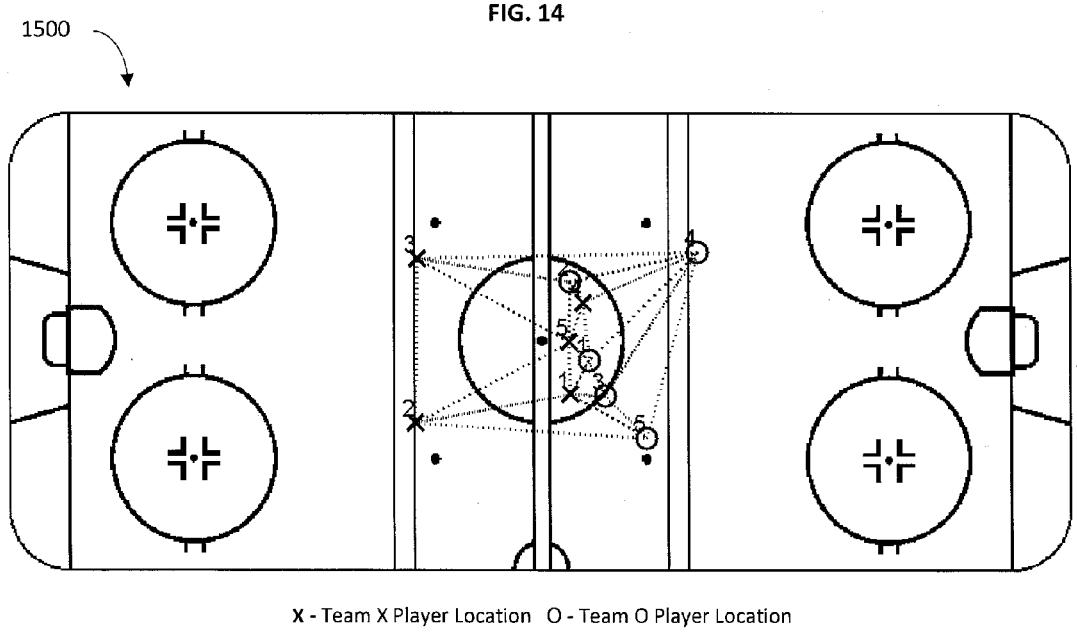
FIG. 15 depicts a cartographic report produced in the reporting subsystem, using ice hockey as an example, determined using the player analysis subsystem, showing the nearest neighbor distances between projected players on the ice rink.
Figure 16:
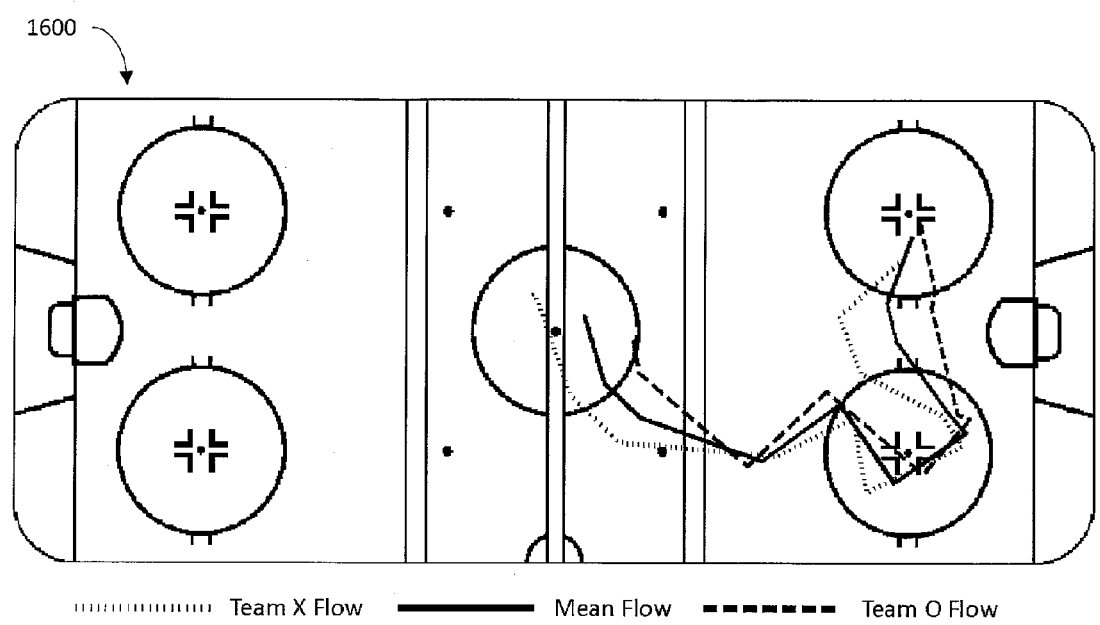
FIG. 16 depicts a cartographic report produced in the reporting subsystem, using ice hockey as an example, determined using the player analysis subsystem, showing the mean flow of players within a team on the ice rink and mean flow of all players across both teams on the ice rink using a network analysis of center of gravity results.

The player analysis subsystem 140 analyzes player planimetric locations either within teams or across teams over a duration of play or analyzes the CG planimetric locations within teams or across teams over a duration of play (FIG. 12). Data for processing under the player analysis subsystem 140 includes, but is not limited to retrieval or storage from said computer 120. That is, the analysis subsystem may analyze data from sources other than the same computer that runs the object detection subsystem. The player analysis subsystem 140 includes, but is not limited to analysis of data derived within the system. The basis for the techniques used in the processing and analyzing of player planimetric locations or processing and analyzing of CG planimetric team locations within the player analysis subsystem 140 are found in the public domain. In this stage of the present embodiment, the static CG planimetric location for a given team is determined using the weighted average of player planimetric locations on a given team indexed to a single image frame identifier. Either the X direction for the set of players or mean in the Y direction for the set of players can be weighted by a function. Using ice hockey as an example (FIG. 13), the CG planimetric location within a team 1310 or across teams 1320 is determined by finding the mean X direction for the designated set of players and mean in the Y direction for the designated set of players, where the weighting function includes, but is not limited to Y=f(Y). Dynamic team tracking by CG planimetric locations over a duration of play can be completed by using team CG planimetric locations indexed to a series of image frame identifiers that define a duration of play. The player analysis subsystem 140 procedures include, but are not limited to deriving additional data from player planimetric locations or from team CG planimetric locations such as: 1) zone locations, areas, and perimeters FIG. 14; 2) pattern analysis of player(s) or team(s) to determine player connectivity FIG. 15; 3) network analysis to determine the flow of player(s) on the field of play or flow of team(s) on the field of play FIG. 16; 4) spatial interpolation of player(s) or team(s) by using splines, inverse distance weighting, or kriging methods; 5) hypothesis testing of player(s) or team(s) using Z tests, F tests, T-tests, Chi-squared tests; and 6) forecast modelling using ANNs, polynomial regression, multivariate regression, or exponential smoothing. Results found with the player analysis subsystem 140 are then presented using the reporting subsystem 150.

Figures 17, 18:
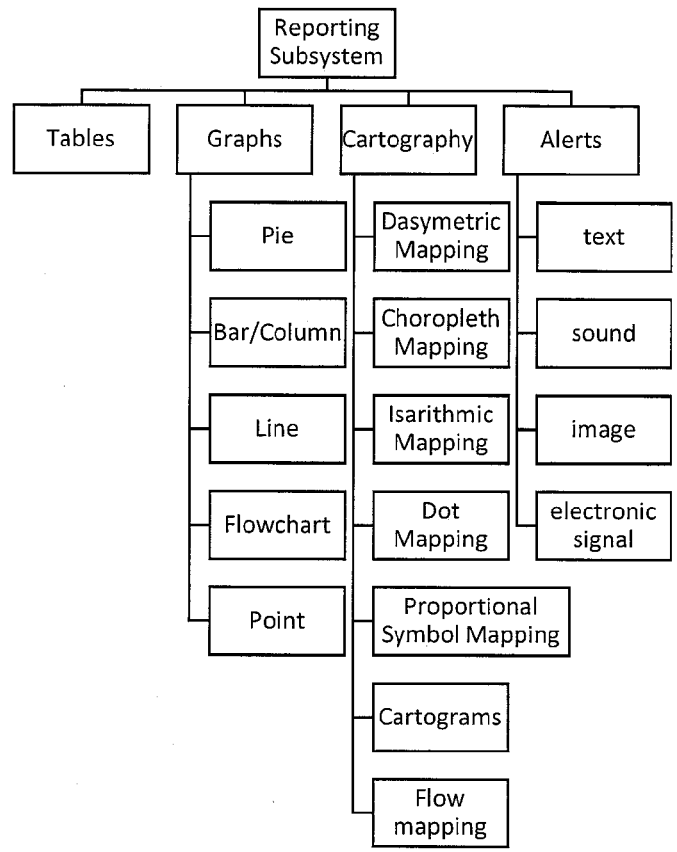
FIG. 17 depicts the categories of reports that can be generated using the reporting subsystem.
FIG. 18 depicts a tabular report produced in the reporting subsystem, using ice hockey as an example, determined using the player analysis subsystem, showing team flow rates.
Figure 21:
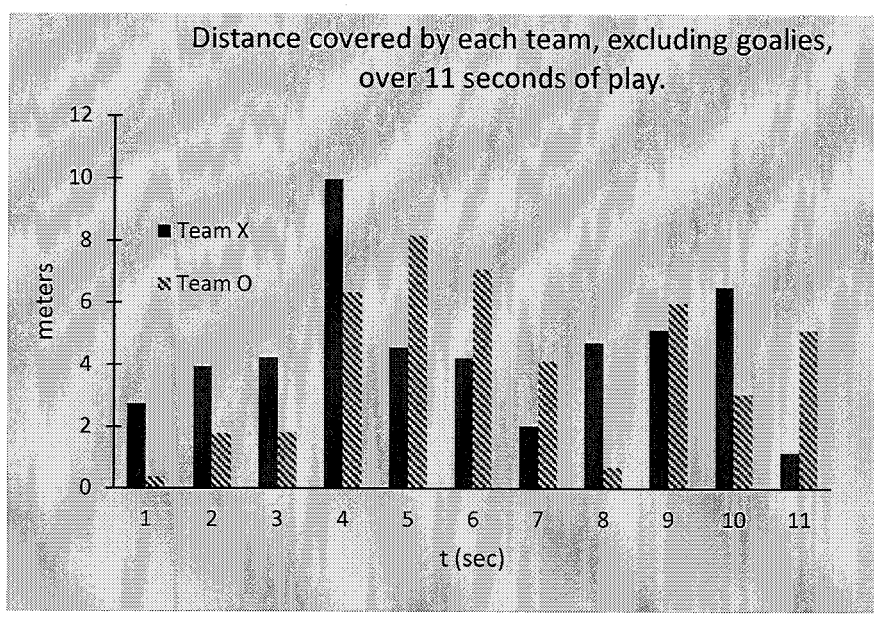
FIG. 21 depicts a graph report produced in the reporting subsystem, using ice hockey as an example, determined using the player analysis subsystem, showing the distance covered by each team over 11 seconds of play.

As shown in FIG. 17, the reporting subsystem 150 produces and delivers results of the player analysis subsystem 140. The basis for the presentation steps found in the reporting subsystem 150 are found in the public domain. The reporting subsystem 150 includes, but is not limited to the production of tables (FIG. 18, FIG. 19, FIG. 20) charts and graphs (FIG. 21), and cartography (FIG. 14, FIG. 15, FIG. 16) in analog or electronic formats. The reporting subsystem 150 also includes, but is not limited to the delivery of reports using electronic networks in real time or analog and electronic networks in near real time.

In addition to other improvements and advantages mentioned above, the disclosed embodiments of the present invention improves on operation of the computer(s) through increased function and productivity occurring in the computer-user interface. The computer-user interface requires minimal user input. This is exemplified by: 1) the use of image intensities radiometrically calibrated to a "white balance" standard for normalizing image intensities and thus minimize changes to respective conditional expressions applied for object detection that would otherwise require user input, 2) use of spectral enhancements which cancel out changes in irradiance across images and thus eliminate the need for radiometric image calibration across images avoid the need for changes to respective conditional expressions that would otherwise require user input, 3) the use of supervised ANN models, that require no user input, pretrained on detecting the objects of interest (face off spots, players etc.), 4) use of automated topology detection, 5) use of automated ICP creation from extracted field of play markings, 6) automated relational pairing of ICP's with RCP's using topology labels, 7) use of NRMSE and minimum control point thresholds in the projection transformation modelling and affine transformation modelling to eliminate the need for user input, 8) automated cartographic and tabular analysis that eliminates the need for user input, and 9) automated cartographic and tabular analysis reporting that eliminates the need for user input.

The presently disclosed processes are semi-automated with little user input required or fully-automated with no user input required, thereby providing another actual improvement in the field of the image processing technology itself. The disclosed invention provides a turn-key approach to extracting players and analyzing players from video. In some embodiments, the only time user input may be required would be to initialize the conditional expressions. Even in such instances, user-input would only be required if the field of play marker extraction success rate was lower than desired.

The invention has practical applications for sports fans, sports players, and sports management. For example, from a business perspective in sports management, results can be used to personalize the fan-team relationship by keeping fans engaged whether by email, social media, news media, or website. This in turn allows the opportunity to add value to the team franchise and learn more about their fans interests, boost fan loyalty, and increase their fan base. Results of the invention are also tangible metrics that have a practical use for the coaching side of sports management and players of the game to identify strengths and weaknesses of their team while identifying the opportunities and threats of opposing teams to improve performance and generate winning defensive and offensive strategies. Using ice hockey as an example, results of CG positions (FIG. 13) could be used to determine patterns in the overall position of players on each team at the time of a scoring event. In addition, using ice hockey as an example, results of network flow by CG (FIG. 16, FIG. 18, FIG. 21) could be used to determine the pace of each team during a game. Another result of practical use of the invention for the coaches and players using ice hockey as an example, would be a player's span of control relative to other players span of control on the sheet of ice, as defined by the location, areal extent, and distances covered on the ice by each player (FIG. 14, FIG. 15, FIG. 19, FIG. 20) to observe proper coverage of opposing players while ensuring puck passing connectivity with players on the same team. The invention contains an object detection subsystem that extracts player locations from video that are in turn used in a player analysis subsystem that produces metrics conveyed in the reporting subsystem resulting in tangible outputs that can be applied in a practical context for sports fans, sports players, and sports management.

Although the illustrated embodiment is presented in the context of ice hockey, it will be appreciated that application of the present invention is in no way limited to this particular sport, and may be similarly employed to various other sports with field of play markings.

Any and all references cited herein are incorporated by reference in their entirety.

The invention claimed is:
1. A method for improved automated processing of a single image frame or multiple image frames acquired from a video source, said processing being performed by one or more computers and comprising the following computer-implemented steps of:
   a) selecting an image frame from said single image frame or from said multiple image frames,
   b) creating multispectral ratios, multispectral indices, and multispectral transformations from the wavebands of said selected image frame from step (a),
   c) producing a field of play mask using polychotomous classification of said multispectral ratios, multispectral indices, and multispectral transformations from step (b),
   d) identifying field of play marking object candidates from said selected image frame from step (a) using polychotomous classification of said multispectral ratios, multispectral indices, and multispectral transformations from step (b) under said field of play mask from step (c),
   e) creating univariate object shape measures of said field of play marking object candidates from step (d),
   f) creating field of play markings with topology from said field of play marking object candidates from step (d) using conditional expressions applied to said multispectral ratios, multispectral indices, and multispectral transformations from step (b) and said univariate object shape measures from step (e), or ANN modelling inputs of said multispectral ratios, multispectral indices, and multispectral transformations from step (b) and said univariate object shape measures from step (e), or the Radon transform,
   g) creating xy image control points from erosion of said field of play markings with topology from step (f),
   h) creating field of play control lines with topology using linear regression modelling from said field of play markings with topology from step (f),
   i) creating xy image control points with topology from intersections of said field of play control lines with topology from step (h),
   j) building a point to point file by combining said image control points from steps (g) and (i) and pairing said image control points from steps (g) and (i) with the predefined field of play reference control points,
   k) creating a perspective projection image to field of play georeferencing transformation model from said point to point file from step (j),
   l) identifying player object candidates from said selected image frame using polychotomous classification of said multispectral ratios, multispectral indices, and multispectral transformations from step (b) under said field of play mask from step (c),
   m) creating univariate object shape measures of the said player object candidates from step (l),
   n) outputting and labelling player object fragments by team from said player object candidates from step (l) using ANN models of inputs containing said multispectral ratios, multispectral indices, and multispectral transformations from step (b) and said univariate object shape measures from step (m), o) creating XY Cartesian player fragment locations by team, registered to the field of play, by applying the said transformation model from step (k) to said player object fragments by team from step (n), p) aggregate said XY Cartesian player fragment locations by team from step (o) to identify single XY Cartesian player locations for each player on each team, and q) save player locations, team identifier, the perspective projection image to field of play georeferencing transformation model, control points, rink topology, and image frame identifier on a non-transitory computer readable medium.

2. The method of claim 1 wherein said multiple image frames are acquired from the video source, and at least some of said multiple image frames vary from one another in scale and oblique view angle.

3. The method of claim 1 comprising performing steps (a) to (q) on said multiple image frames, and producing an automatic final bundle adjustment model to correct participant location errors across said multiple image frames by performing the following additional computer-implemented steps of:

r) transforming said image control points from steps (g) and (i) of each of said multiple image frames using a perspective projection image frame georeferencing transformation model from step (k) and relating said transformed image control points to all predefined field of play reference control points, s) building a final bundle adjustment affine transformation model using results from step (r), t) applying said final bundle adjustment affine transformation model from step (s) on said single XY Cartesian player locations for each player on each team from step (p) from said multiple image frames, u) storing said final bundle adjustment affine transformation model from step (s) and final adjusted player location results from step (t) in non-transitory computer readable memory.

4. The method of claim 1 comprising a further computer-implemented step of performing CG calculations and performing a network analysis based thereon, including calculation of flow speed, flow direction, distance between team paths, and/or dispersal of team paths.

5. The method of claim 1 comprising a further computer-implemented step of performing CG calculations and performing a pattern analysis based thereon, including calculation of: player nearest neighbor distances, player zone coverage, team density, team adjacency, team connectivity, and/or player isolation.

6. The method of claim 1 comprising a further computer-implemented step of performing CG calculations and performing a spatial interpolation analysis based thereon, including performance of trend surface modelling, spline interpolations, inverse distance weighting, or kriging.

7. The method of claim 1 comprising a further computer-implemented step of performing of a hypothesis testing analysis based upon CG calculations, which is comprised of statistical analysis of a null and alternative hypothesis of measurements derived from player locations.

8. The method of claim 1 comprising a further computer-implemented step of performing of a forecast analysis based upon CG calculations, which is comprised of ANN models, polynomial regression, multivariate regression, and exponential smoothing to predict future outcomes.

9. The method of claim 1 further comprising computer generation of tables, graphs, cartography, and alerts, and analog or digital presentation of at least one of said tables, graphs, cartography, and alerts.

10. The method of claim 9 wherein said tables are comprised of: numeric, text, or alphanumeric data.

11. The method of claim 9 wherein said graphs are comprised of: pie, bar/column, line, flowchart, or point graphs.

12. The method of claim 9 wherein said cartography is comprised of: dasymetric mapping, choropleth mapping, isarithmic mapping, dot mapping, proportional symbol mapping, cartograms, or flow mapping cartography.

13. The method of claim 9 wherein said alerts are comprised of: text, sound, image, or electronic signals.

14. The method of claim 1 comprising wide-cast electronic delivery of output data from one or more analyses performed in said method.

15. Non-transitory computer readable memory having stored thereon statements and instructions for execution by a computer processor to perform the method of claim 1.

16. A system for improved automated processing of a single image frame or multiple image frames acquired from a video source, the system comprising one or more computers having at least one processor and non-transitory computer readable memory connected to said at least one processor, said computer readable memory having stored thereon statements and instructions for execution by said at least one processor to perform the method of claim 1.

17. A method of producing an automatic final bundle adjustment model to correct participant location errors across multiple image frames that have been analyzed to detect and locate players from opposing teams among a plurality of sport participants in said multiple image frames, the method comprising the following computer-implemented steps of:

a) transforming image control points from each of said multiple image frames using a respective image frame georeferencing transformation model and relating said transformed image control points to all predefined field of play reference control points, b) building a final bundle adjustment model using results from step (a), c) applying said final bundle adjustment model from step (b) on single Cartesian XY player locations for each player on each team, and d) storing said final bundle adjustment model from step (b) and final adjusted player location results from step (c) in non-transitory computer readable memory.

18. Non-transitory computer readable memory having stored thereon statements and instructions for execution by a computer processor to perform the method of claim 17.

19. A system for producing an automatic final bundle adjustment model to correct participant location errors across multiple image frames that have been analyzed to detect and locate players from opposing teams among a plurality of sport participants in said multiple image frames, the system comprising one or more computers having at least one processor and non-transitory computer readable memory connected to said at least one processor, said computer readable memory having stored thereon statements and instructions for execution by said at least one processor to perform the method of claim 17.

* * * * *